US008077346B2

(12) United States Patent
Okazawa et al.

(10) Patent No.: US 8,077,346 B2
(45) Date of Patent: Dec. 13, 2011

(54) GAP ADJUSTMENT APPARATUS AND IMAGE FORMATION APPARATUS

(75) Inventors: Yoshiyuki Okazawa, Shiojiri (JP); Sanshiro Takeshita, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 844 days.

(21) Appl. No.: 12/132,169

(22) Filed: Jun. 3, 2008

(65) Prior Publication Data

US 2008/0304086 A1 Dec. 11, 2008

(30) Foreign Application Priority Data

Jun. 7, 2007 (JP) ................................ 2007-151394

(51) Int. Cl.
*G06F 15/00* (2006.01)
*B41J 25/308* (2006.01)

(52) U.S. Cl. ............................................ 358/1.5; 347/8

(58) Field of Classification Search .................. 347/1, 3, 347/5, 12, 108, 8; 400/103; 358/1.3, 1.8, 358/296
See application file for complete search history.

(56) References Cited

U.S. PATENT DOCUMENTS

| | | | | |
|---|---|---|---|---|
| 2002/0057302 | A1 * | 5/2002 | Shimomura et al. | 347/8 |
| 2004/0061911 | A1 * | 4/2004 | Samoto | 358/498 |
| 2004/0189741 | A1 * | 9/2004 | Kimura et al. | 347/33 |
| 2005/0100660 | A1 * | 5/2005 | Ito et al. | 427/66 |
| 2005/0104925 | A1 * | 5/2005 | Kimura | 347/33 |
| 2006/0001696 | A1 * | 1/2006 | Ha et al. | 347/32 |
| 2006/0268087 | A1 * | 11/2006 | Sasa | 347/101 |
| 2007/0046721 | A1 * | 3/2007 | Miyazawa | 347/29 |
| 2007/0048057 | A1 * | 3/2007 | Youn et al. | 400/58 |
| 2007/0085873 | A1 * | 4/2007 | Jung | 347/22 |
| 2007/0176953 | A1 * | 8/2007 | Han | 347/14 |
| 2007/0291056 | A1 * | 12/2007 | Tanahashi et al. | 347/8 |
| 2008/0225087 | A1 * | 9/2008 | Lee et al. | 347/55 |

FOREIGN PATENT DOCUMENTS

| | | |
|---|---|---|
| CN | 2559487 Y | 7/2003 |
| JP | 2007-001071 | 1/2007 |

* cited by examiner

*Primary Examiner* — Jerome Grant, II
(74) *Attorney, Agent, or Firm* — Workman Nydegger

(57) ABSTRACT

The invention provides, as a first aspect thereof, a gap adjustment apparatus that includes: a recording section; a guide axis that supports the recording section in such a manner that the recording section can move while facing a recording target medium, the guide axis being able to move in such a manner that a gap between the recording section and the recording target medium can be adjusted; a cam section that is either provided directly on the guide axis or provided not directly on the guide axis so as to engage indirectly with the guide axis, the cam section being able to rotate so as to move the guide axis; a rotatable member that rotates together with the cam section; an arm section that is provided either as a part of or on the rotatable member and substantially radiates out from a rotation axis line of the rotatable member; and a rotating section that is brought into engagement with the arm section as the recording section moves in a main scan direction and rotates the rotatable member by transmitting a force to the rotatable member via the arm section.

7 Claims, 15 Drawing Sheets

FIG. 11

| PG POSITIONS | PG |
|---|---|
| 1 | PG1 |
| 2 | PG2 |
| 3 | PG3 |
| 4 | PG7 |

FIG. 12

NUMBER OF TIMES OF RECIPROCATORY MOVEMENTS OF CARRIAGE

| | | TARGET PG POSITION | | | |
|---|---|---|---|---|---|
| | | 1 | 2 | 3 | 4 |
| CURRENT PG POSITIONS | 1 | 0 | 1 | 2 | 6 |
| | 2 | 7 | 0 | 1 | 5 |
| | 3 | 6 | 7 | 0 | 4 |
| | 4 | 2 | 3 | 4 | 0 |

GAP ADJUSTMENT APPARATUS AND IMAGE FORMATION APPARATUS

BACKGROUND

1. Technical Field

The present invention relates to a gap adjustment apparatus. In addition, the present invention further relates to an image formation apparatus such as an ink-jet printer, though not limited thereto, that is provided with a gap adjustment apparatus.

2. Related Art

An ink-jet printer is known as an example of an image formation apparatus that ejects ink drops (fluid, including liquid) onto a sheet of recording paper such as printing paper. An ink-jet printer ejects ink drops from a recording head that is provided on the bottom of a carriage thereof. A combination of a carriage and a recording head, though not necessarily limited thereto, constitutes a non-limiting example of a "recording section" according to the invention. Recording paper constitutes a non-limiting example of a "recording target medium" according to the invention. In the following description, an ink-jet printer is simply referred to as a "printer". A printer having the above-explained basic function is provided with a guide axis that supports a carriage while guiding the movement of the carriage in a main-scan direction. Having such a guide axis, the printer ejects ink drops from a recording head onto a sheet of recording paper that is fed on a platen while reciprocating the carriage along the guide axis in the main-scan direction, thereby performing printing thereon.

When such a printer performs printing, various kinds of recording paper that has thicknesses different from one to another depending on its particular use can be used as the target of printing. In addition, such a printer ejects ink drops onto the surface of recording paper from a recording head while moving the relative positions of the recording head and the recording paper. Therefore, at each time when the thickness of recording paper that is used as the target of printing changes from one to another, the distance between the recording head and the surface of recording paper changes accordingly. This might cause some displacement in the landing positions of ink drops, resulting in a decrease in printing precision. In an effort to provide a technical solution to such a problem, a printer having a gap controlling means (which corresponds to "gap adjustment apparatus" according to the invention) has been proposed so far, an example of which is described in JP-A-2007-1071. The printer having the gap controlling means described in JP-A-2007-1071 moves up or down a carriage (recording section) in accordance with the thickness of recording paper (recording target medium) so as to adjust the gap between the recording head and the recording paper into an appropriate distance.

In the configuration of the printer having the gap controlling means described in JP-A-2007-1071, a gap control cam (which corresponds to "cam" according to the invention) is attached to each axial end of a carriage guide axis (which corresponds to "guide axis" according to the invention). In addition, a fixation pin that functions as a cam follower is fixed to a position adjacent to the attachment position of the gap control cams. The printer having the gap controlling means described in JP-A-2007-1071 adjusts the gap between the recording head and the recording paper into an appropriate distance as follows. As the carriage guide axis turns, the gap control cams rotate. As the gap control cams rotate, the axial center of the carriage guide axis moves in a vertical direction due to camming action. In this way, the printer having the gap controlling means described in JP-A-2007-1071 controls the gap between the recording head and the recording paper into an appropriate distance.

When adjusting the gap between the recording head and the recording paper into an appropriate distance, the printer having the gap controlling means described in JP-A-2007-1071 rotates the carriage guide axis by utilizing a driving force of a paper-feed (hereafter abbreviated as "PF") motor, which is provided in order to transport a sheet of recording paper. The PF-motor-driven rotation of the carriage guide axis for gap control places an excessive burden (i.e., load) on the PF motor when it feeds a sheet of recording paper. For this reason, if the configuration of the printer having the gap controlling means described in JP-A-2007-1071 is adopted, there is an adverse possibility that recording paper may not be transported in a smooth movement.

SUMMARY

An advantage of some aspects of the invention is to provide a gap adjustment apparatus that is capable of adjusting a gap between a recording head, which is a non-limiting example of a part of the recording section, and recording paper, which is a non-limiting example of the recording target medium, into an appropriate distance by utilizing a driving force of a carriage, which is a non-limiting example of a part of the recording section. In addition, the invention further provides, as an advantage of some aspects thereof, an image formation apparatus that is provided with such a gap adjustment apparatus.

In order to address the above-identified problem without any limitation thereto, the invention provides, as a first aspect thereof, a gap adjustment apparatus that includes: a recording section; a guide axis that supports the recording section in such a manner that the recording section can move while facing a recording target medium, the guide axis being able to move in such a manner that a gap between the recording section and the recording target medium can be adjusted; a cam section that is either provided directly on the guide axis or provided not directly on the guide axis so as to engage indirectly with the guide axis, the cam section being able to rotate so as to move the guide axis; a rotatable member that rotates together with the cam section; an arm section that is provided either as a part of or on the rotatable member and substantially radiates out from a rotation axis line of the rotatable member; and a rotating section that is brought into engagement with the arm section as the recording section moves in a main scan direction and rotates the rotatable member by transmitting a force to the rotatable member via the arm section.

In the configuration of a gap adjustment apparatus according to the first aspect of the invention described above, as the recording section moves in the main scan direction, the cam section rotates together with the rotatable member, which is rotated as a result of the transmission of a force by the rotating section to the rotatable member via the arm section. As the cam section rotates together with the rotatable member, the guide axis moves. By this means, it is possible to adjust a gap between the recording section and the recording target medium into an appropriate distance by utilizing a driving force of the recording section.

In the configuration of a gap adjustment apparatus according to the first aspect of the invention described above, it is preferable that the rotating section should have a sliding-contact portion that moves together with the recording section in the main scan direction; and, at the time when the recording section moves in the main scan direction, the arm section should slide on the sliding-contact portion in such a manner that the rotatable member rotates.

With such a preferred configuration of a gap adjustment apparatus according to the first aspect of the invention described above, as a result of the sliding movement of the arm section on the sliding-contact portion, it is possible to transmit a driving force of the recording section to the rotatable member in a reliable manner.

In the preferred configuration of the gap adjustment apparatus according to the first aspect of the invention described above, it is further preferable that the sliding-contact portion should have a first sloped surface that is brought into sliding-contact with the arm section at the time when the recording section moves in an outward direction so as to rotate the rotatable member in a predetermined direction and further have a second sloped surface that is brought into sliding-contact with the arm section at the time when the recording section moves in a homeward direction so as to rotate the rotatable member in the predetermined direction.

With such a preferred configuration of a gap adjustment apparatus according to the first aspect of the invention described above, it is possible to make the movement width of the recording section that is required for rotating the rotatable member smaller.

In the configuration of a gap adjustment apparatus according to the first aspect of the invention described above, it is preferable that the arm section should have at least three arms.

With such a preferred configuration of a gap adjustment apparatus according to the first aspect of the invention described above, it is possible to rotate the rotatable member by means of the rotating section in a smooth manner, which is achieved by forming the arms with equal spaces provided therebetween as viewed along the circumferential direction of the rotatable member.

In the configuration of a gap adjustment apparatus according to the first aspect of the invention described above, it is preferable that the arm section should have a plurality of arms; and a burden that is placed at the time when one of the plurality of arms is brought into engagement with the rotating section should differ from a burden that is placed at the time when each of the remaining arms other than the above-mentioned one of the plurality of arms is brought into engagement with the rotating section.

With such a preferred configuration of a gap adjustment apparatus according to the first aspect of the invention described above, it is possible to make a judgment as to whether a certain arm that is in engagement with the rotating section is the above-mentioned one of the plurality of arms or any one of remaining arms other than the above-mentioned one of the plurality of arms on the basis of a detection result of a burden placed at each time when an arm is brought into engagement with the rotating section.

It is preferable that a gap adjustment apparatus having the preferred configuration described above should further include: a burden detecting section that detects a burden placed at each time when an arm is brought into engagement with the rotating section; and a judging section that judges, on the basis of a result of detection made by the burden detecting section, an initial position of the cam section that corresponds to the engagement of the above-mentioned one of the plurality of arms and the rotating section.

With such a preferred configuration of a gap adjustment apparatus according to the first aspect of the invention described above, it is possible to detect an initial position of the cam section in a reliable manner on the basis of the detection result of a burden placed at the time when the above-mentioned one of the plurality of arms is brought into engagement with the rotating section because the initial position of the cam section corresponds to the engagement of the above-mentioned one of the plurality of arms and the rotating section.

In the configuration of a gap adjustment apparatus according to the first aspect of the invention described above, it is preferable that the cam section should be made up of cams that rotate together with the guide axis around a rotation axis line that is in alignment with, or, the same as, the axis line of the guide axis.

With such a preferred configuration of a gap adjustment apparatus according to the first aspect of the invention described above, it is possible to simplify the structure of the cam section.

In the configuration of a gap adjustment apparatus according to the first aspect of the invention described above, it is preferable that the rotatable member should be provided on at least one end portion of two end portions of the guide axis.

With such a preferred configuration of a gap adjustment apparatus according to the first aspect of the invention described above, it is possible to rotate the rotatable member (s) in an efficient manner, which is achieved by rotating the rotatable member(s) together with the guide axis around a rotation axis line that is in alignment with, or, the same as, the axis line of the guide axis.

In order to address the above-identified problem without any limitation thereto, the invention provides, as a second aspect thereof, an image formation apparatus that is provided with a gap adjustment apparatus according to the first aspect of the invention described above.

With such a configuration of an image formation apparatus according to the second aspect of the invention, it is possible to obtain the same advantageous effects as those offered by a gap adjustment apparatus according to the first aspect of the invention described above.

BRIEF DESCRIPTION OF THE DRAWINGS

The invention will be described with reference to the accompanying drawings, wherein like numbers reference like elements.

FIG. 5A is a perspective view that schematically illustrates a pre-engagement operation state of the sliding-contact portion and the rotatable member in the configuration of an ink-jet printer according to the first embodiment of the invention, whereas

FIG. 6A is a perspective view that schematically illustrates an engagement operation state of the sliding-contact portion and the rotatable member in the configuration of an ink-jet printer according to the first embodiment of the invention, whereas

FIG. 7A is a perspective view that schematically illustrates an engagement operation state of the sliding-contact portion and the rotatable member in the configuration of an ink-jet printer according to the first embodiment of the invention, whereas

FIG. 8A is a perspective view that schematically illustrates an engagement operation state of the sliding-contact portion and the rotatable member in the configuration of an ink-jet printer according to the first embodiment of the invention, whereas

FIG. 9A is a perspective view that schematically illustrates a post-engagement (i.e., released, or after-engagement) operation state of the sliding-contact portion and the rotatable member in the configuration of an ink-jet printer according to the first embodiment of the invention, whereas

FIG. 11 is a table that shows the relationship between PG positions and platen gaps in the configuration of an ink-jet printer according to the first embodiment of the invention.

FIG. 12 is a table that shows the number of times of reciprocatory movements of the carriage that is required for changing the platen gap PG from a current PG position to a desired target PG position, which is shown in a matrix made up of a combination of each of four possible current PG positions 1, 2, 3, and 4 and each of four possible target PG positions 1, 2, 3, and 4, which is adopted in the configuration of an ink-jet printer according to the first embodiment of the invention.

DESCRIPTION OF EXEMPLARY EMBODIMENTS

First Embodiment

With reference to the accompanying drawings, an ink-jet printer according to a first exemplary embodiment of the invention is explained below. It should be noted that, unless otherwise specified, the terms "anteroposterior direction" (or, when viewed in a reverse orientation, "posteroanterior direction"), "vertical direction", and "horizontal direction" that appear in the following description correspond to the forward/backward (front/back) direction, the upward/downward (top/bottom) direction, and leftward/rightward (left/right) direction, respectively, as viewed from or with respect to an ink-jet printer illustrated in FIG. 1.

Figure 1:
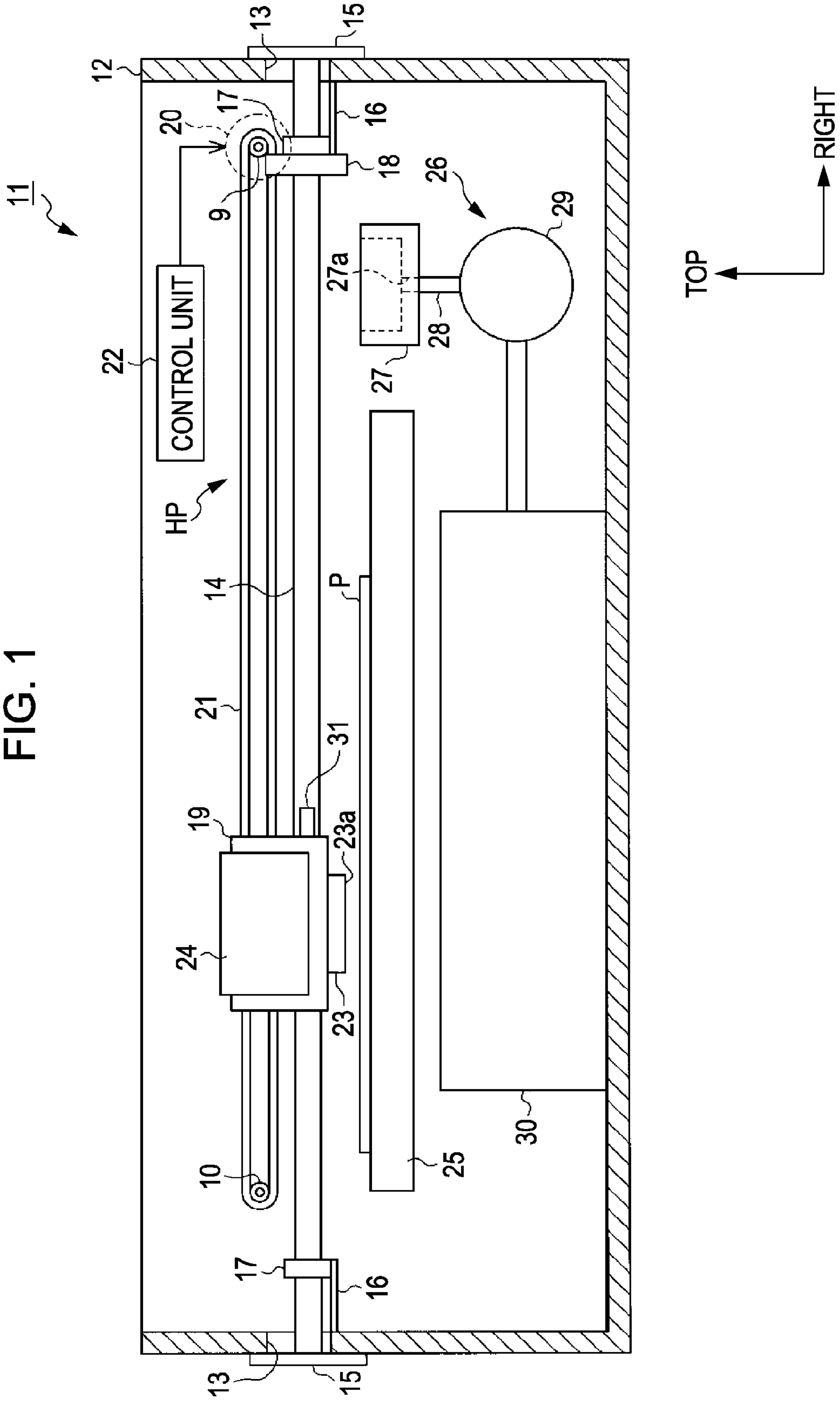
FIG. 1 is a front sectional view that schematically illustrates an example of the configuration of an ink-jet printer according to a first embodiment of the invention.

As illustrated in FIG. 1, an ink-jet printer 11, which is a non-limiting example of an image formation apparatus according to an exemplary embodiment of the invention, is provided with a printer body case 12. The printer body case 12 covers the entire inner components of the ink-jet printer 11. The printer body case 12 is a box-like enclosure that has a substantially rectangular shape with a bottom. An elongated through hole 13 is formed in each of the left sidewall of the printer body case 12 and the right sidewall thereof. Each of these elongated through holes 13 is formed therein at a position closer to the upper edge thereof than the lower edge thereof. Each of these through holes 13 is elongated in a vertical direction in a plan view. One of these elongated through holes 13 is formed so as to "face" the other thereof to provide a symmetrical configuration. A guide axis 14, which has the shape of a round bar, is provided between the left sidewall of the printer body case 12 and the right sidewall thereof in such a manner that the guide axis 14 extends in a horizontal direction. Each end portion of the guide axis 14 is inserted through the corresponding one of the elongated through holes 13.

The outer diameter of the guide axis 14 is substantially the same as the width of the elongated through hole 13 that is measured in the anteroposterior direction defined above. With such a structure, each end portion of the guide axis 14 that is inserted through the corresponding one of the elongated through holes 13 can move in a sliding manner along the corresponding elongated through hole 13. Accordingly, the structure of these elongated through holes 13 allows the guide axis 14 to move in the vertical direction while supporting, or, in other words, partially restricting the movement of, the guide axis 14 so that it (guide axis 14) does not move in the anteroposterior direction. Each end of the guide axis 14 is connected to the center of the corresponding one of a pair of cover plates 15 each of which has the shape of a disc. Each of the pair of discoid cover plates 15 covers the corresponding one of the elongated through holes 13 from the outside of the printer body case 12. One surface (inner surface) of each of these discoid cover plates 15 that is closer to the printer body case 12 than the other surface (outer surface) thereof is in contact with the corresponding sidewall (i.e., left sidewall or right sidewall) of the printer body case 12 in such a manner that each of these discoid cover plates 15 can slide on the corresponding sidewall thereof.

A supporting pin 16 is provided on the inner surface of each of the sidewalls of the printer body case 12, or, more specifically, at a position under the elongated through hole 13. Each of the pair of supporting pins 16 projects inward from the inner surface of the sidewall of the printer body case 12. At each end portion of the guide axis 14, a cam member 17, which has the shape of a plate, is provided at a little distance away from the inner surface of the corresponding one of the sidewalls of the printer body case 12. The cam member 17 is a non-limiting example of a "cam section" according to the invention.

Figure 2:
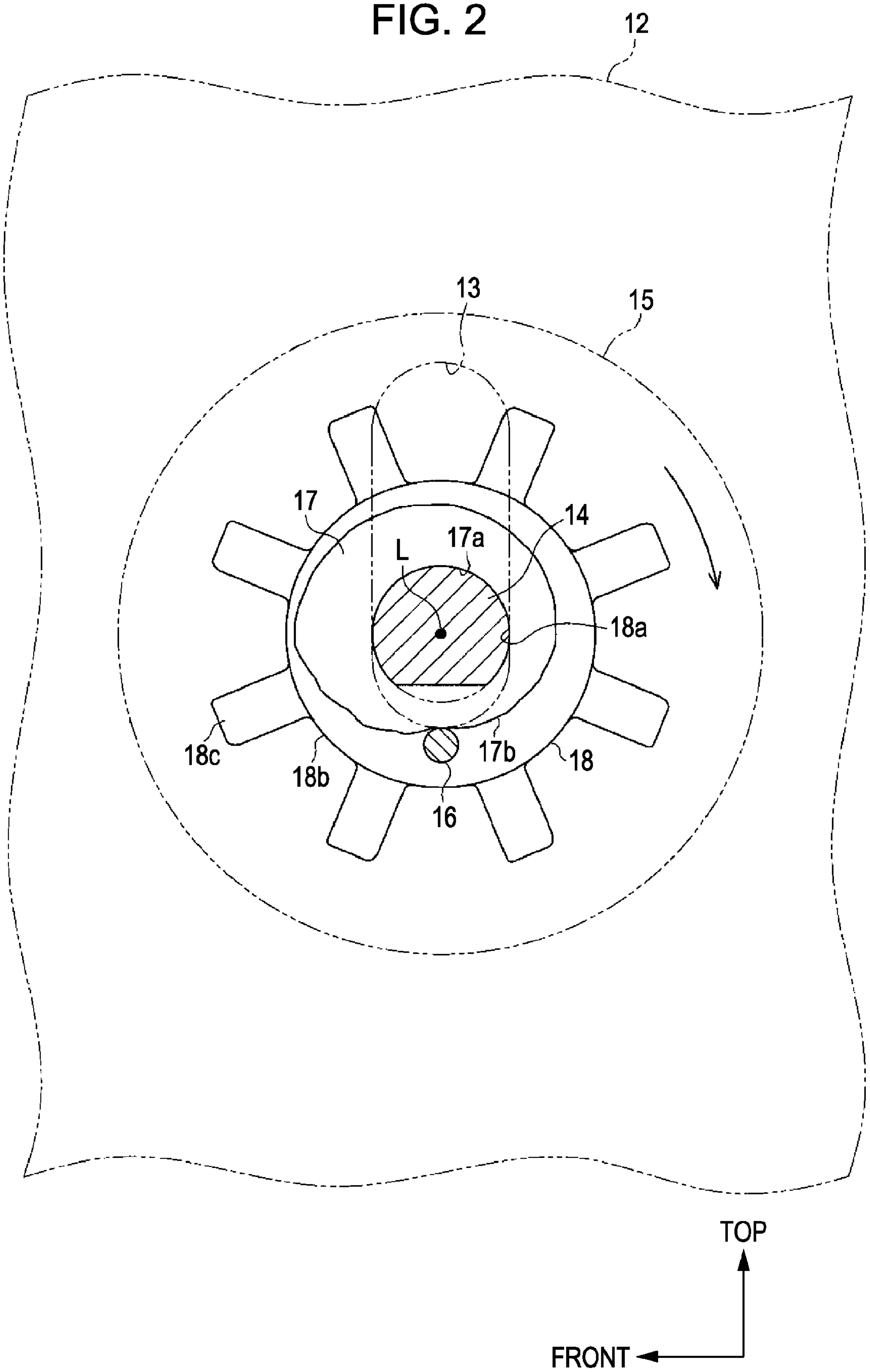
FIG. 2 is a sectional view that schematically illustrates an exemplary configuration of an essential part of the ink-jet printer illustrated in FIG. 1.

Each of the cam members 17 has a through hole 17*a*. As shown in FIG. 2, the through hole 17*a* of each of the cam members 17 has, in its cross section, the shape of a "partially line-cut" circle, which resembles an alphabet D. In the illustrated example of the through hole 17*a*, the lower region thereof is formed as a line segment portion of the D-shaped cross section thereof. The guide axis 14 is fitted in each of the through holes 17*a* of the cam members 17. That is, the cross-sectional shape of each of the hole-insertion (i.e., insertion-fit) portions of the guide axis 14 that is fitted in the corresponding one of the through holes 17*a* of the cam members 17 corresponds to the cross-sectional shape of the through hole 17*a* thereof. Each of the cam members 17 has a cam surface 17*b*, which is an outer peripheral surface thereof. The cam surface 17*b* has a non-circular shape with the axis line L of the guide axis 14 as its center. Or, in other words, the cam surface 17*b* has a polygonal shape that slightly resembles an imperfect round. In the present embodiment of the invention, the cam surface 17*b* is shaped as an icosidodecagon, or, simply said, a 32-sided polygon. Each of the pair of supporting pins 16 supports the cam surface 17*b* of the corresponding one of the pair of cam members 17.

As illustrated in FIG. 1, a gear-shaped rotatable member 18 is provided on the right end portion of the guide axis 14 in such a manner that the rotatable member 18 contacts the left-side surface of the right one of the pair of the cam members 17. As illustrated in FIG. 2, the rotatable member 18 has a through hole 18*a* that corresponds to the through hole 17*a* of the cam member 17. The right end portion of the guide axis 14 is fitted in the through hole 18*a*. That is, the cross-sectional shape of the hole-insertion (i.e., insertion-fit) portion of the guide axis 14 that is fitted in the through hole 18*a* of the rotatable member 18 corresponds to the cross-sectional shape of the through hole 18*a* thereof. The axis line L of the guide axis 14 is in alignment with the rotation axis line of the rotatable member 18.

The rotatable member 18 has a body portion 18*b* and a plurality of arm portions 18*c*. The body portion 18*b* of the rotatable member 18 has the shape of a disc having the through hole 18*b* formed therein. The plurality of arm portions 18*c* is formed on the outer peripheral surface of the discoid body portion 18*b*. The plurality of arm portions 18*c* radiates out from the axis line L of the guide axis 14, which is the center of the radiation array pattern. In the configuration of the ink-jet printer 11 (image formation apparatus) according to the present embodiment of the invention, the rotatable member 18 has eight arm portions 18*c*. These arm portions 18*c* are formed with equal spaces provided therebetween as viewed along the circumferential direction of the rotatable member 18. These arm portions 18*c* constitute a non-limiting example of an "arm section" according to the invention.

Figure 4:
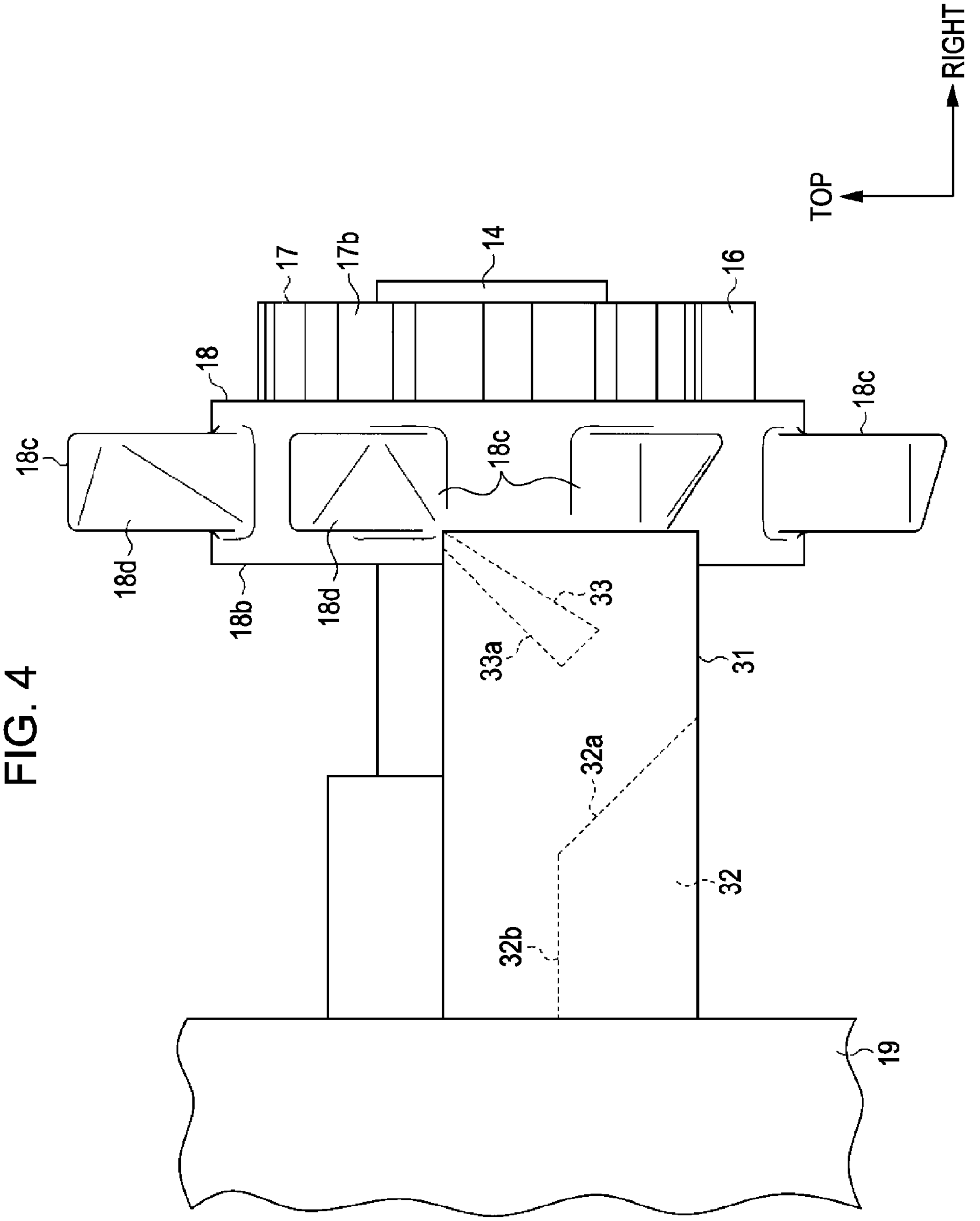
FIG. 4 is an enlarged view that schematically illustrates an exemplary configuration of an essential part of an ink-jet printer according to the first embodiment of the invention, specifically, the positional relationship between a sliding-contact portion and a rotatable member.

As illustrated in FIG. 4, the base of each of the plurality of arm portions 18*c* has a substantially quadrangular shape in its cross section, whereas the apical (i.e., top) surface of each of the plurality of arm portions 18*c* has a substantially triangular shape. Specifically, each of the plurality of arm portions 18*c* has a tri-dimensional (i.e., three-dimensional) shape that is obtained by cutting a quadrangular prism along a virtual plane, where the virtual plane passes through two vertices on the top surface of the quadrangular prism that are diagonally opposite to each other and further passes through one vertex on the base cross section of the quadrangular prism. The cut surface of each arm portion 18*c* of the rotatable member 18 taken along such a virtual plane constitutes a sliding-contact surface 18*d* of arm portion 18*c* thereof. The sliding-contact surface 18*d* of each arm portion 18*c* of the rotatable member 18 is formed as a triangular tapered surface. That is, since the arm portion 18*c* has such a triangular tapered structure, the sectional area (i.e., cross section) of the arm portion 18*c* becomes smaller as it goes from the base of the arm portion 18*c* toward the apical surface thereof.

Figure 3:
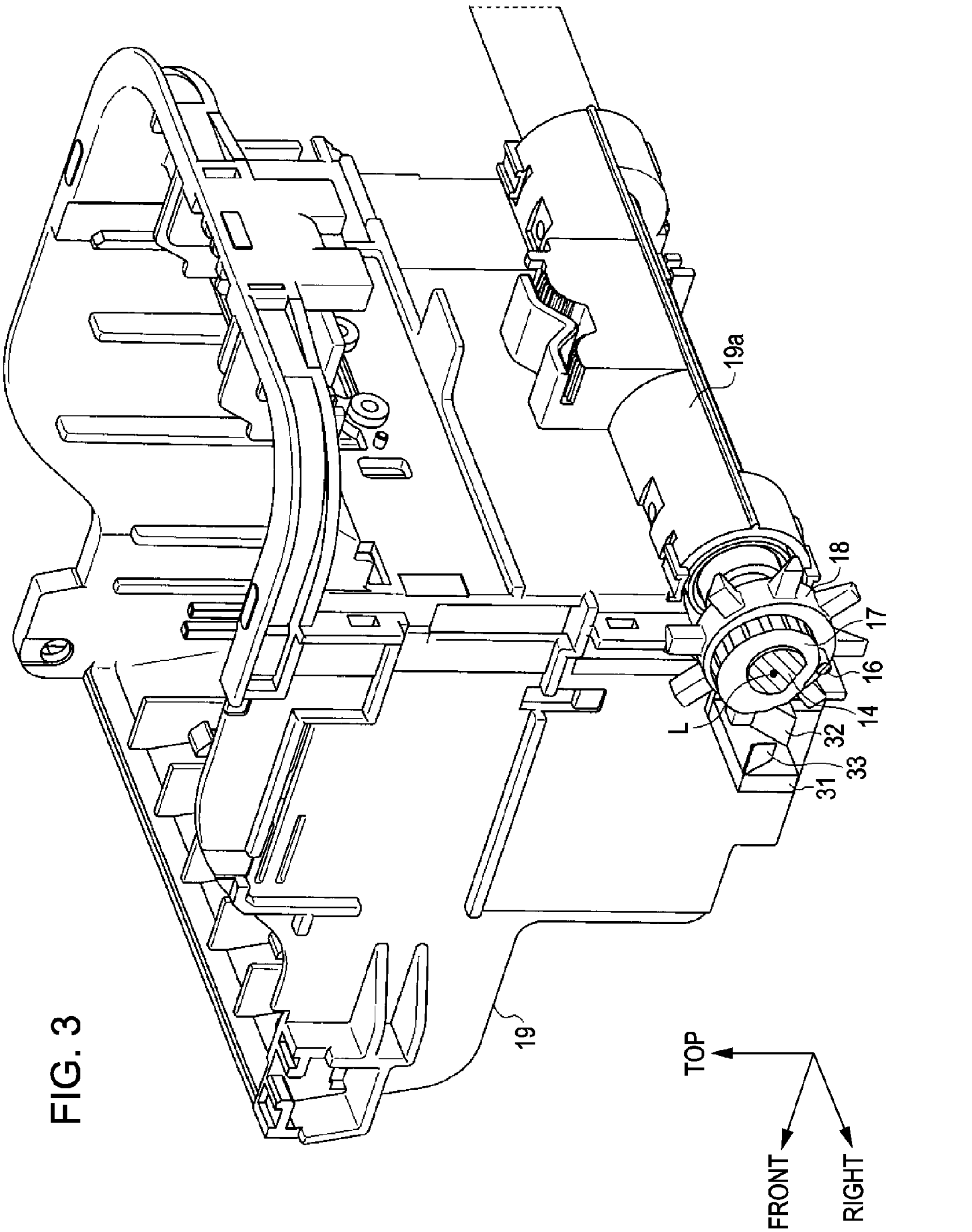
FIG. 3 is a rear right perspective view of a carriage that is provided as a component of an ink-jet printer according to the first embodiment of the invention.

As shown in FIG. 1, a carriage 19 that constitutes at least a part of a non-limiting example of the recording section according to the invention is provided on the guide axis 14 in such a manner that the carriage 19 can move in the main scan direction, that is, the horizontal direction, along the guide axis 14. Specifically, the guide axis 14 supports the carriage 19 as follows. As illustrated in FIG. 3, a supporting sleeve 19*a* that has the shape of a cylinder is provided at a lower region on the rear surface of the carriage 19. The cylindrical supporting sleeve 19*a* is attached to the carriage 19 in such a manner that it extends in the horizontal direction. The guide axis 14 is provided, through insertion thereof, inside the cylindrical supporting sleeve 19*a*. With such a configuration, the carriage 19 is supported on the guide axis 14 in such a manner that it can move in the main scan direction along the guide axis 14.

As illustrated in FIG. 1, a driving pulley 9 and a driven pulley 10 are provided on the inner surface of the rear wall of the printer body case 12 at positions corresponding to the end portions of the guide axis 14, respectively. Each of the driving pulley 9 and the driven pulley 10 is provided so that it can rotate freely. A carriage motor 20 is connected to the driving pulley 9. The carriage motor 20 supplies a driving force so as to reciprocate the carriage 19 along the guide axis 14. A timing belt 21 is stretched between the driving pulley 9 and the driven pulley 10. The carriage 19 is fixed to the timing belt 21.

As the driving power of the carriage motor 20 is transmitted to the carriage 19 via the timing belt 21, the carriage 19 can move in the main scan direction, that is, the horizontal direction, while being supported by the guide axis 14. The carriage motor 20 is electrically connected to a control unit 22 that is provided inside the printer body case 12. With such an electric connection provided therebetween, the control unit 22 can control the driving state of the carriage motor 20. The control unit 22 constitutes a non-limiting example of a "burden detecting section" and a "judging section".

A recording head 23, which constitutes at least a part of a non-limiting example of the recording section according to the invention, is provided at the bottom of the carriage 19. The bottom surface of the recording head 23 is formed as a nozzle surface 23*a*. A plurality of nozzles is formed on the nozzle surface 23*a* of the recording head 23. Note that the plurality of nozzles is not shown in the drawing. Ink cartridges 24 are detachably attached to the cartridge attachment portion of the carriage 19 provided over the recording head 23. Ink is contained in the ink cartridges 24 in such a manner that the ink can be supplied to the recording head 23.

A platen 25, which extends in the horizontal direction, is provided below the carriage 19 inside the printer body case 12. The platen 25 is a supporting table that supports recording paper P, which constitutes a non-limiting example of a "recording target medium" according to the invention. A paper-feed mechanism (i.e., paper-transport mechanism) is provided on the upper surface of the platen 25. Note that the paper-feed mechanism is not illustrated in the drawing. A paper-feed motor, which is not illustrated in the drawing, provides a driving force to the paper-feed mechanism. Driven by the paper-feed motor, the paper-feed mechanism transports (moves) recording paper P in a forward direction.

Piezoelectric elements, which are not illustrated in the drawing, are provided in the recording head 23. When these piezoelectric elements are driven on the basis of print data while the carriage 19 reciprocates along the guide axis 14, ink is ejected from each of the aforementioned nozzles, which are not shown in the drawing, of the recording head 23 onto a sheet of the recording paper P that is fed in a forward direction. In this way, printing is performed on the recording paper P.

A non-printing area is provided at the right end region inside the printer body case 12. The non-printing area is a region that does not contribute to printing. A home position, which is denoted as HP, is provided at the non-printing area. The home position HP is the standby position of the carriage 19 where the carriage 19 stays at the time when printing is not being performed. A cleaning mechanism 26 is provided under the home position HP. The cleaning mechanism 26 is used for cleaning the recording head 23. The cleaning mechanism 26 is provided with a cap 27, a drain tube 28, and a suction pump 29.

The cap 27 has the shape of a substantially open-topped quadrangular box with a bottom. A cap-elevation mechanism is provided in the non-printing area. The cap-elevation mechanism supports the cap 27 in such a manner that the cap 27 can reciprocate in the vertical direction (i.e., move up and down). Note that the cap-elevation mechanism is not illustrated in the drawing. A suction hole 27*a* is formed in the bottom wall of the cap 27. The suction hole 27*a* penetrates through the bottom wall of the cap 27 in the vertical direction. When the cap 27 is lifted up after the carriage 19 has moved to, or when the carriage stays at, the home position HP, the cap 27 is brought into contact with the recording head 23 so as to seal each of the aforementioned nozzles, which are not illustrated in the drawing.

One end of the drain tube 28 is in communication with the suction hole 27*a* of the cap 27, whereas the other end of the drain tube 28 is in communication with a drain ink collection tank 30. The drain ink collection tank 30 is provided on the inner-wall bottom surface of the printer body case 12 below the platen 25. Therefore, a space inside the cap 27 is in communication with a space inside the drain ink collection tank 30 via the drain tube 28. The suction pump 29 is provided at an intermediate position of the drain tube 28. The suction pump 29 provides a suction force to the inner space of the cap 27 toward the drain ink collection tank 30.

Due to the suction force provided thereto by the suction pump 29, thickened ink and/or bubbles, if any, is/are "vacuum-removed" from each of the nozzles (not shown) of the recording head 23 into the cap 27; thereafter, the vacuum-removed thickened ink (and/or bubbles) is drained into the drain ink collection tank 30 via the drain tube 28. In this way, the cleaning of the recording head 23 is performed.

As illustrated in FIGS. 1 and 3, a sliding-contact portion 31, which has the shape of a block (brick), is provided on the rear lower-end region on the right surface of the carriage 19. During the reciprocation of the carriage 19, the sliding-contact portion 31 of the carriage 19 is brought into contact with the arm portion 18*c* in a sliding manner from the direction along the rotation axis line of the rotatable member 18 (i.e., the axis line L of the guide axis 14) so as to turn the rotatable member 18. The sliding-contact portion 31 constitutes a non-limiting example of a "rotating section" according to the invention. As shown in FIGS. 3 and 4, when viewed along the anteroposterior direction defined above, a first sloped portion 32 that has the shape of a trapezoid is formed at the left lower region on the rear surface of the sliding-contact portion 31. The trapezoidal first sloped portion 32 projects in a backward direction. On the other hand, when viewed along the anteroposterior direction, a second sloped portion 33 that has the shape of an "elongated quadrangle" (e.g., elongated trapezoid, though not limited thereto) is formed at the right upper region on the rear surface of the sliding-contact portion 31. The elongated-quadrangular second sloped portion 33 has, when viewed along the anteroposterior direction, a slope that goes down from right to left. The elongated-quadrangular second sloped portion 33 projects in a backward direction. The gap between the first sloped portion 32 and the second sloped portion 33 is set to be large enough so that the arm portion 18*c* of the rotatable member 18 can pass through therebetween.

The right surface of the first sloped portion 32 constitutes a first sloped surface 32*a*, which slopes down from left to right as illustrated in FIG. 4. The top surface of the first sloped portion 32 constitutes a level flat surface 32*b* as illustrated therein. On the other hand, the upper surface of the second sloped portion 33 constitutes a second sloped surface 33*a*, which slopes down from right to left. The first sloped surface 32*a* of the first sloped portion 32 is formed so that it can fit the sliding-contact surface 18*d* of each of the arm portions 18*c* of the rotatable member 18. The flat surface 32*b* of the first sloped portion 32 is at the same height as the lower end of the second sloped surface 33*a* of the second sloped portion 33.

In the configuration of the ink-jet printer 11 according to the present embodiment of the invention, the guide axis 14, the supporting pins 16, the cam members 17, the rotatable member 18, and the carriage 19 make up a gap adjustment apparatus according to an exemplary embodiment of the invention. The gap adjustment apparatus adjusts a platen gap PG, which is the gap, or, in other words, distance, between the recording head 23 and the platen 25, so as to adjust the gap (i.e., distance) between the recording head 23 and recording paper P that is fed on the platen 25.

In the following description, a method for adjusting the platen gap PG is explained.

Figure 5A:
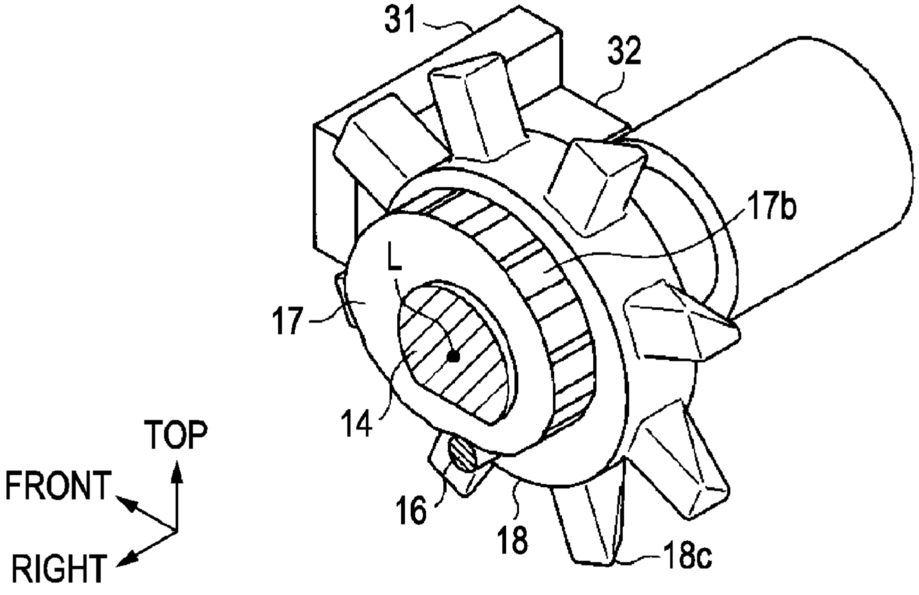
Figure 5B:
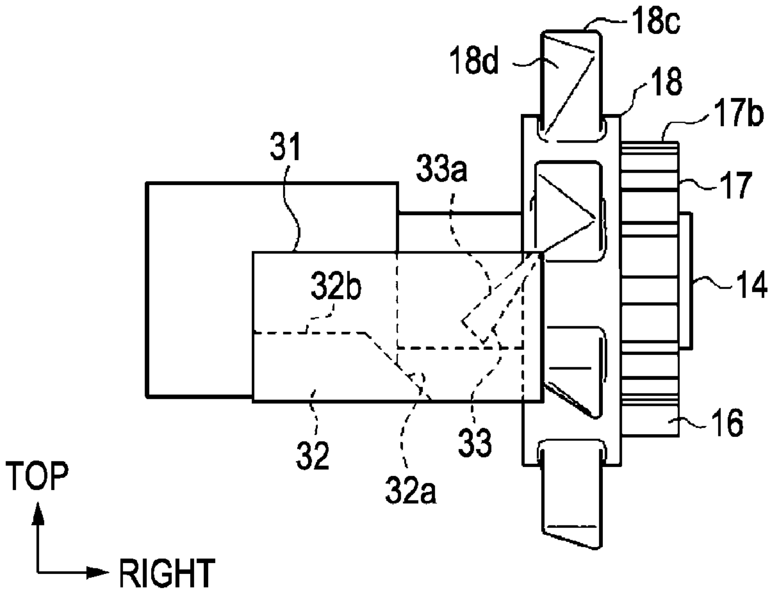
FIG. 5B is a side view that schematically illustrates the pre-engagement operation state of the sliding-contact portion and the rotatable member illustrated in FIG. 5A.
Figure 6A:
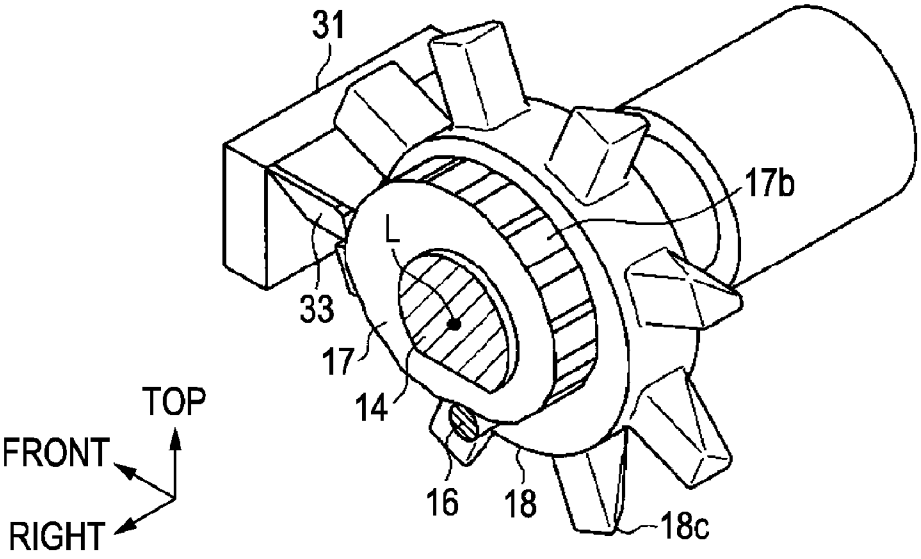
Figure 6B:
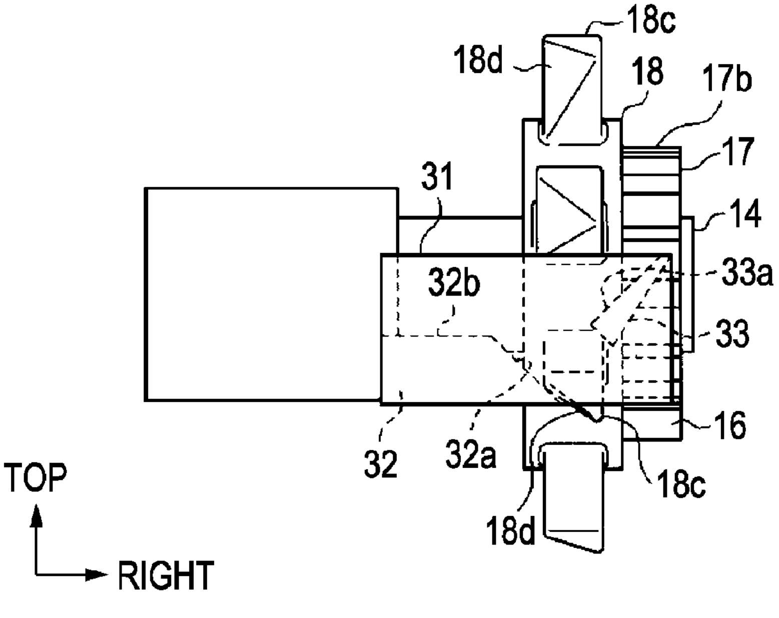
FIG. 6B is a side view that schematically illustrates the engagement operation state of the sliding-contact portion and the rotatable member illustrated in FIG. 6A.

As a first step of platen gap (PG) adjustment, as illustrated in FIGS. 5A and 5B, the carriage motor 20 (refer to FIG. 1) is driven so as to move the carriage 19 (refer to FIG. 4) to the home position HP. By this means, the sliding-contact portion 31 is positioned in the proximity of the rotatable member 18. After the sliding-contact portion 31 has been positioned in the proximity of the rotatable member 18, the carriage 19 (refer to FIG. 4) is further moved in a rightward direction, that is, toward the non-printing area. Hereafter, the above-described rightward movement of the carriage 19 from its home position HP is referred to as "outward movement". As a result of the above-described further rightward movement (outward movement) of the carriage 19, as illustrated in FIGS. 6A and 6B, the sliding-contact portion 31 is brought into engagement with one of the arm portions 18*c* of the rotatable member 18. That is, the sliding-contact surface 18*d* of one of the arm portions 18*c* of the rotatable member 18 is brought into "sliding-contact" with the first sloped surface 32*a* of the first sloped portion 32.

Figure 7A:
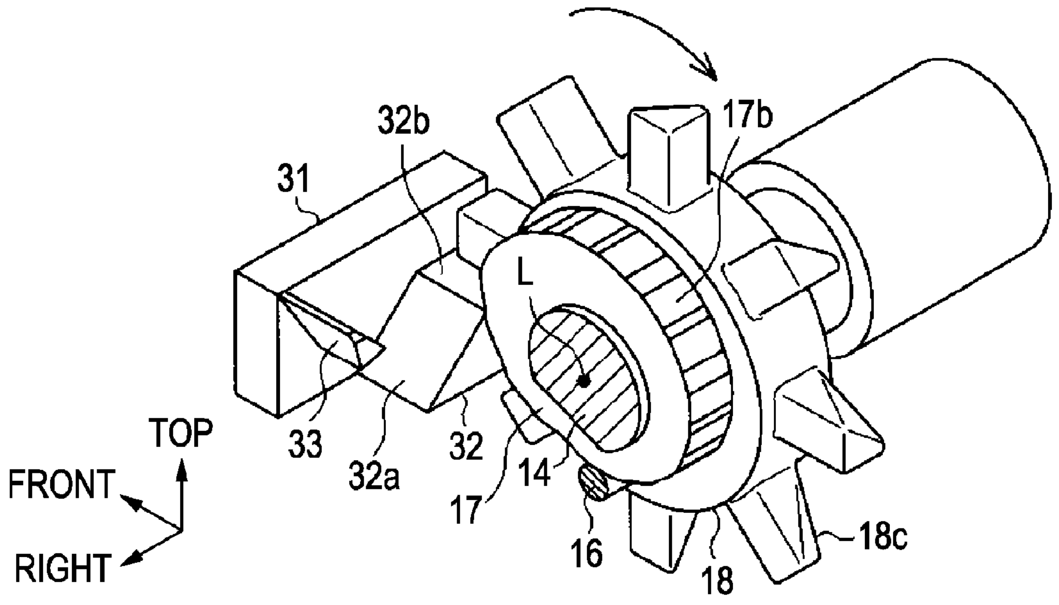
Figure 7B:
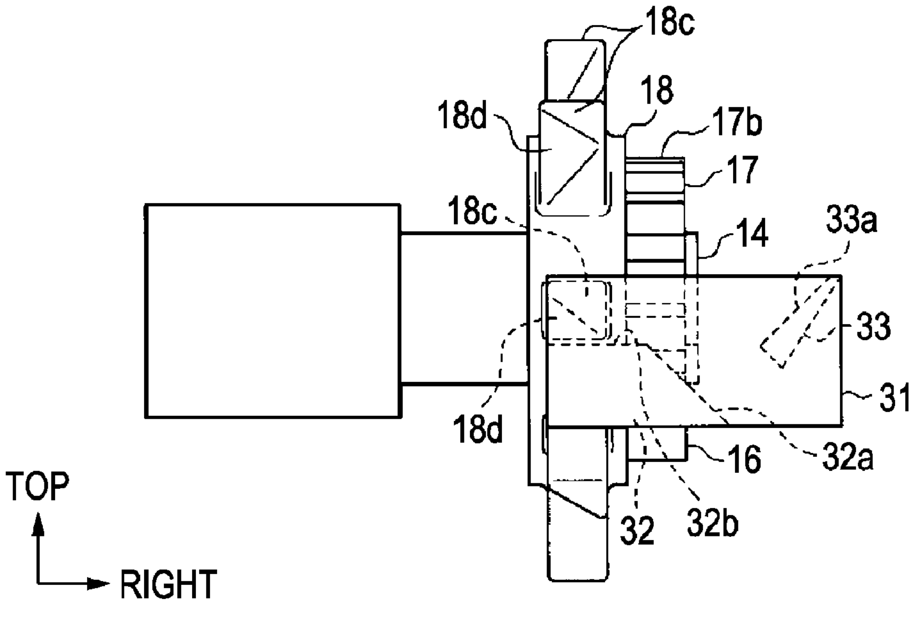
FIG. 7B is a side view that schematically illustrates the engagement operation state of the sliding-contact portion and the rotatable member illustrated in FIG. 7A.

After the sliding-contact surface 18*d* of one of the arm portions 18*c* of the rotatable member 18 has been brought into sliding-contact with the first sloped surface 32*a* of the first sloped portion 32, the carriage 19 (refer to FIG. 4) is further moved in a rightward direction (i.e., outward movement). As a result of the above-described further rightward movement of the carriage 19, as illustrated in FIGS. 7A and 7B, the arm portion 18*c* moves up along the first sloped surface 32*a* of the first sloped portion 32 while the sliding-contact surface 18*d* of the arm portion 18*c* is in contact with, in a sliding manner, the first sloped surface 32*a* of the first sloped portion 32. As the arm portion 18*c* moves up, when viewed from the right side thereof, the rotatable member 18 rotates in the clockwise direction around the axis line L of the guide axis 14. It should be noted that an arrow shown in FIG. 7A indicates this rotation direction, which is a non-limiting example of a "predetermined direction" according to the invention.

As the rotatable member 18 rotates in the clockwise direction around the axis line L of the guide axis 14, the guide axis 14 rotates together with the rotatable member 18 in the clockwise direction around the axis line L thereof when viewed from the right side thereof. In addition, as the guide axis 14 rotates in the clockwise direction around the axis line L thereof, the cam member 17 rotates together with the guide axis 14 in the clockwise direction around the axis line L of the guide axis 14 when viewed from the right side thereof. That is, the rotatable member 18, the guide axis 14, and the cam member (i.e., cam members) 17 rotate together around the axis line L of the guide axis 14.

After the arm portion 18*c* has finished moving up along the first sloped surface 32*a* of the first sloped portion 32, the position of the arm portion 18*c* relative to the position of the sliding-contact portion 31 moves to the left while a "lower-adjacent" surface of the arm portion 18*c* that is next to the sliding-contact surface 18*d* thereof is in contact with, in a sliding manner, the flat surface 32*b* of the first sloped portion 32. As the flat surface 32*b* of the first sloped portion 32 slides under the lower-adjacent surface of the arm portion 18*c* (which is adjacent to the sliding-contact surface 18*d* thereof), the left end of the arm portion 18*c* is brought into contact with the right surface of the carriage 19 (refer to FIG. 4). After the left end of the arm portion 18*c* has been brought into contact with the right surface of the carriage 19 (refer to FIG. 4), the traveling direction of the carriage 19 is reversed; that is, the carriage 19 is moved in a leftward direction, that is, toward the printing area. Hereafter, the above-described leftward movement of the carriage 19 therefrom is referred to as "homeward movement".

Figure 8A:
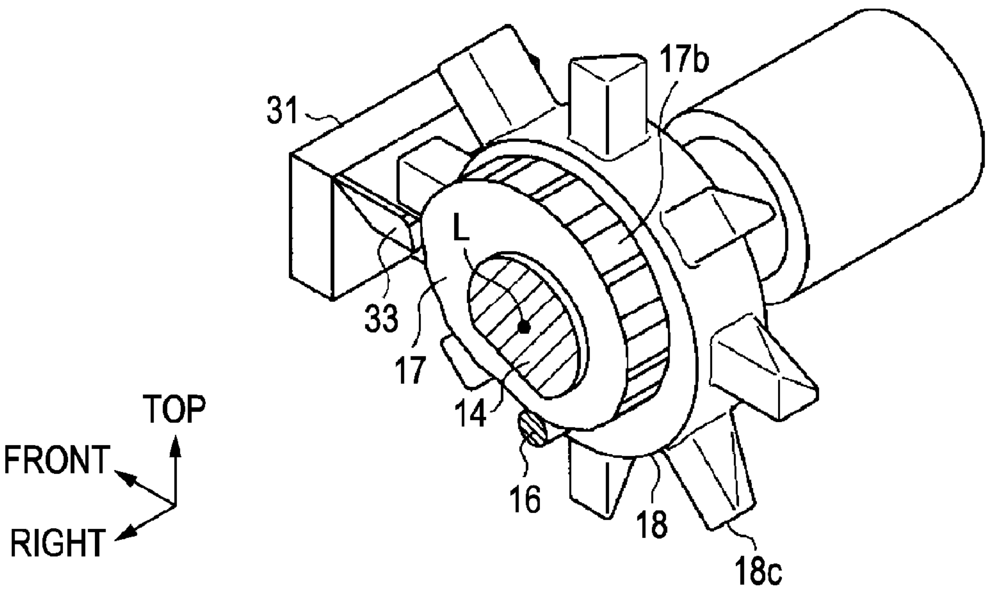
Figure 8B:
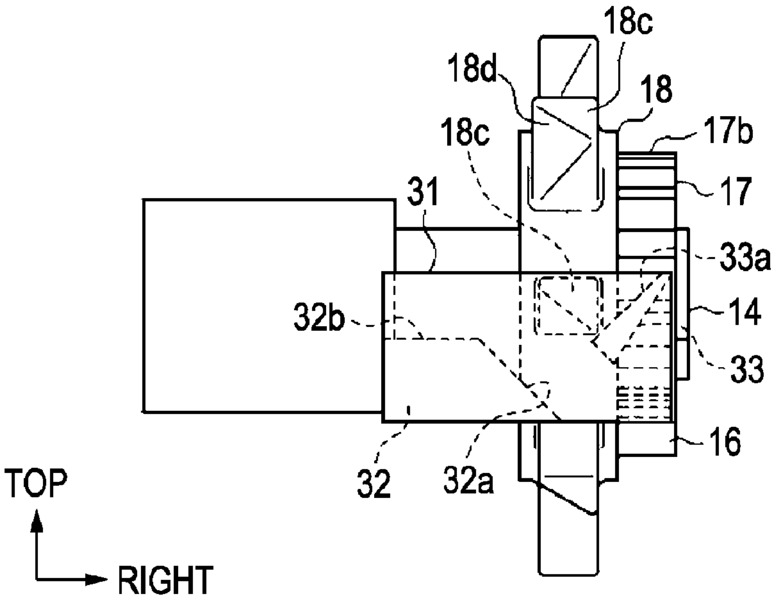
FIG. 8B is a side view that schematically illustrates the engagement operation state of the sliding-contact portion and the rotatable member illustrated in FIG. 8A.
Figure 9A:
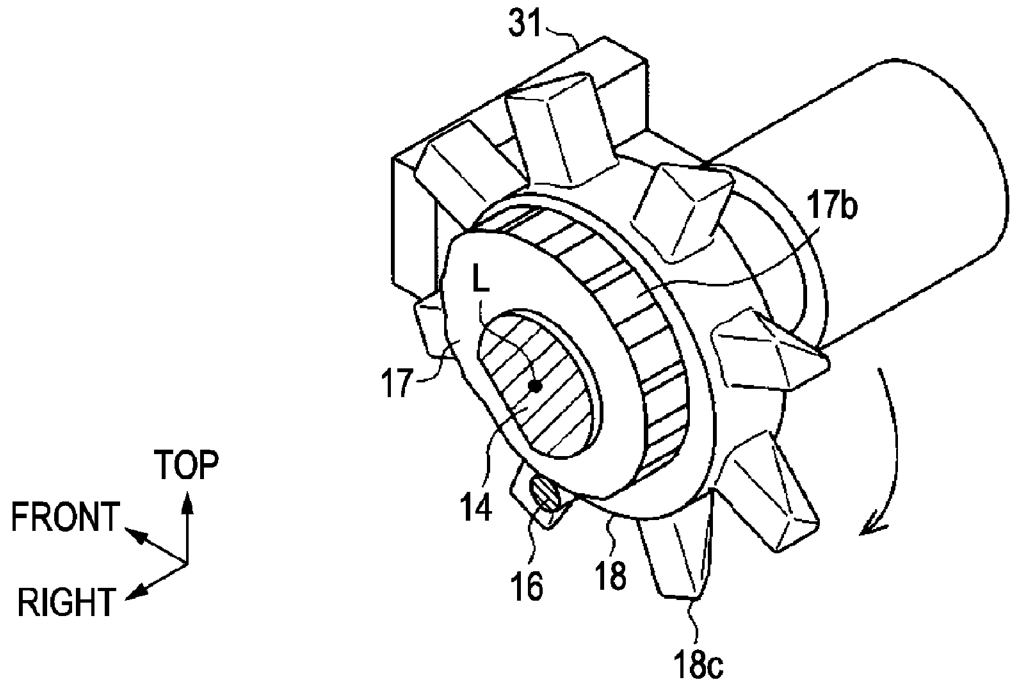
Figure 9B:
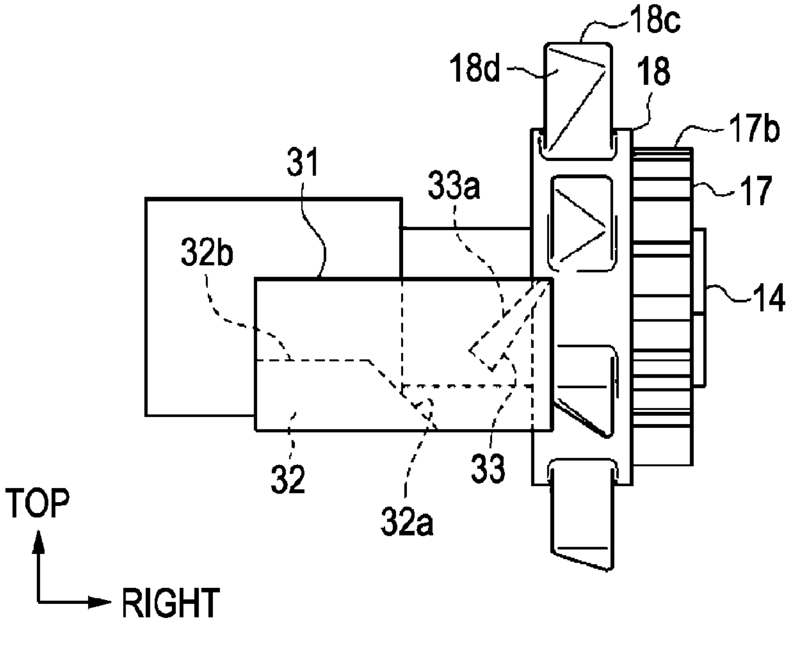
FIG. 9B is a side view that schematically illustrates the post-engagement operation state of the sliding-contact portion and the rotatable member illustrated in FIG. 9A.

As a result of the leftward movement (i.e., homeward movement) of the carriage 19, the lower right corner of the arm portion 18*c* is brought into contact with the lower end of the second sloped surface 33*a* of the second sloped portion 33 as illustrated in FIGS. 8A and 8B. After the lower right corner of the arm portion 18*c* has been brought into contact with the lower end of the second sloped surface 33*a* of the second sloped portion 33, the carriage 19 (refer to FIG. 4) is further moved in a leftward direction (i.e., homeward movement). As a result of the above-described further leftward movement of the carriage 19, as illustrated in FIGS. 9A and 9B, the arm portion 18*c* moves up along the second sloped surface 33*a* of the second sloped portion 33 while the lower right corner of the arm portion 18*c* is in contact with, in a sliding manner, the second sloped surface 33*a* of the second sloped portion 33. As the arm portion 18*c* moves up, when viewed from the right side thereof, the rotatable member 18, the guide axis 14, and the cam member (cam members) 17 rotate together in the clockwise direction around the axis line L of the guide axis 14. It should be noted that an arrow shown in FIG. 9A indicates this rotation direction, which is a non-limiting example of the predetermined direction according to the invention.

As the carriage 19 (refer to FIG. 4) travels in a reciprocatory manner in the horizontal direction, the cam member 17 rotates together with the rotatable member 18 and the guide axis 14. As the cam member 17 rotates, the cam surface 17*b* of the cam member 17 slides on the supporting pin 16, which is provided at a fixed position. As a result thereof, the position of the cam member 17 that is supported by the supporting pin 16 changes. It should be noted that only one of the pair of the cam members 17 is mentioned herein in order to simplify explanation. As the position of the cam member 17 that is supported by the supporting pin 16 changes, the distance between the axis line L of the guide axis 14 and the supporting pin 16 also changes, which means that the level (i.e., height, or position) of the guide axis 14 that supports the carriage 19 changes accordingly. As a result thereof, the level of the carriage 19 and the level of the recording head 23 that is supported by the carriage 19 change. For this reason, the platen gap PG also changes.

Figure 10:
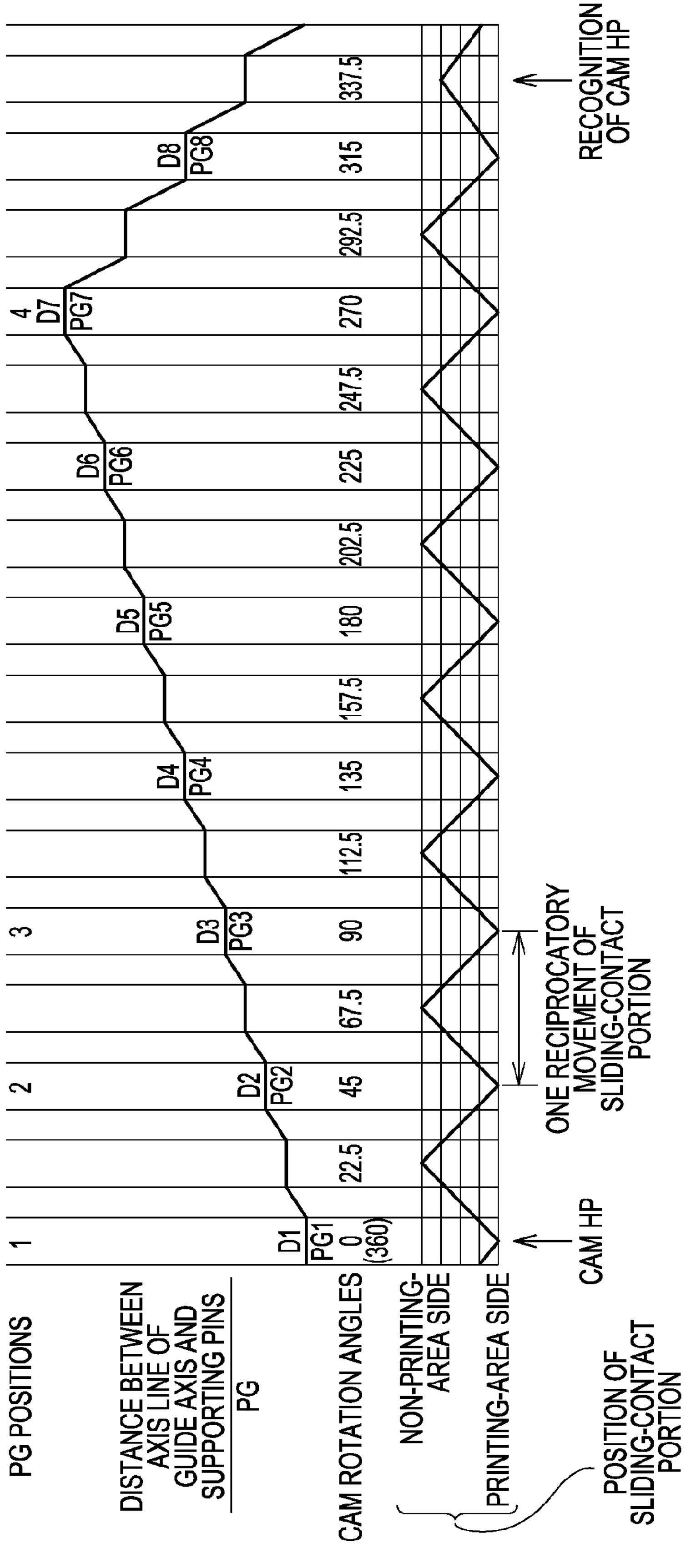
FIG. 10 is an explanatory diagram that schematically illustrates the relationship between cam rotation angles and platen gaps in the configuration of an ink-jet printer according to the first embodiment of the invention.

If the distance between the axis line L of the guide axis 14 and the supporting pin 16 is preset for each predetermined rotation angle of the cam member 17 with the axis line L of the guide axis 14 being the center of the rotation thereof, it is possible to adjust the platen gap PG into a desired value by adjusting the rotation angle of the cam member 17. FIG. 10 illustrates the distance between the axis line L of the guide axis 14 and the supporting pin 16 (or the cam surface 17*b* of the cam member 17) that is preset for each predetermined rotation angle of the cam member 17 with the axis line L of the guide axis 14 being the center of the rotation thereof, which is adopted in the configuration of the ink-jet printer 11 according to the present embodiment of the invention.

As illustrated in FIG. 10, in the configuration of the ink-jet printer 11 according to the present embodiment of the invention, the rotatable member 18, the guide axis 14, and the cam member 17 rotate together in the clockwise direction around the axis line L of the guide axis 14 when viewed from the right side thereof by a rotation angle of 45° for each one reciprocation of the carriage 19, or, in other words, for each one reciprocation of the sliding-contact portion 31, between the right non-printing area and the left printing area. That is, as the carriage 19 (sliding-contact portion 31) travels in the rightward direction, which is the above-defined outward movement, the cam member 17 rotates in the clockwise direction around the axis line L of the guide axis 14 when viewed from the right side thereof by a rotation angle of 22.5°. Then, as the sliding-contact portion 31 moves in the leftward direction, which is the above-defined homeward movement, the cam member 17 further rotates in the clockwise direction around the axis line L of the guide axis 14 when viewed from the right side thereof by another rotation angle of 22.5°.

In addition, in the configuration of the ink-jet printer 11 according to the present embodiment of the invention, the rotation angle of the cam member 17 is preset as 0° when the distance between the axis line L of the guide axis 14 and the supporting pins 16 is D1, or, in other words, when the platen gap PG is PG1. In addition, the position of the cam member 17 that is obtained when the rotation angle of the cam member 17 is 0° is predefined as the initial position thereof. Hereafter, this initial position of the cam member 17 is referred to as the "cam home position", which may be partially abbreviated as "cam HP" in the following description. It should be noted that the cam HP is a state illustrated in FIG. 2.

Moreover, as illustrated in FIGS. 10 and 11, in the configuration of the ink-jet printer 11 according to the present embodiment of the invention, the platen gap PG (PG1) that is obtained when the cam member 17 lies at the cam HP is predefined as the platen gap position 1. The platen gap position may be partially abbreviated as "PG position" in the following description. Furthermore, the platen gap PG (PG2) that is obtained when the cam member 17 rotates together with the guide axis 14 in the clockwise direction around the axis line L of the guide axis 14 when viewed from the right side thereof by a rotation angle of 45° from the cam HP is predefined as the PG position 2.

Still furthermore, the platen gap PG (PG3) that is obtained when the cam member 17 further rotates together with the guide axis 14 in the clockwise direction around the axis line L of the guide axis 14 when viewed from the right side thereof by a rotation angle of 45° from the PG position 2 is predefined as the PG position 3. Still furthermore, the platen gap PG (PG7) that is obtained when the cam member 17 further rotates together with the guide axis 14 in the clockwise direction around the axis line L of the guide axis 14 when viewed from the right side thereof by a rotation angle of 180° from the PG position 3 is predefined as the PG position 4.

Therefore, in the configuration of the ink-jet printer 11 according to the present embodiment of the invention, as illustrated in FIG. 11, the selection, that is, switchover, of the platen gap PG can be made among four positional scales, which are made up of the PG positions 1, 2, 3, and 4. It should be noted that the rotation of the rotatable member 18, the guide axis 14, and the cam member 17 is limited in one direction. That is, the rotatable member 18, the guide axis 14, and the cam member 17 can rotate together in the clockwise direction only (i.e., cannot rotate together in the counter-clockwise direction) around the axis line L of the guide axis 14 when viewed from the right side thereof. For this reason, although it is possible to change the platen gap PG from the PG position 1 to the PG position 2 with just a single reciprocation (i.e., the going and returning thereof just once) of the carriage 19 (sliding-contact portion 31), it is necessary to reciprocate the carriage 19 (sliding-contact portion 31) seven times in order to change the platen gap PG from the PG position 2 to the PG position 1.

FIG. 12 illustrates a table that shows the number of times of reciprocatory movements of the carriage 19 (sliding-contact portion 31) that is required for changing the platen gap PG from a current PG position to a desired target PG position, which is shown in a matrix made up of a combination of each of four possible current PG positions 1, 2, 3, and 4 and each of four possible target PG positions 1, 2, 3, and 4, which is adopted in the configuration of the ink-jet printer 11 according to the present embodiment of the invention. The table shown in FIG. 12 is pre-stored in the aforementioned control unit 22.

Among the plurality of arm portions 18*c* of the rotatable member 18, the last-engaging arm portion 18*c* that engages the sliding-contact portion 31 as the last one thereof when the position of the cam member 17 is going to return to the cam HP, which is hereafter referred to as the last arm portion 18*c*, is formed in such a manner that the width of the last arm portion 18*c* measured in the horizontal direction is slightly larger than the width of each of remaining arm portions 18*c* other than the last arm portion 18*c* measured in the horizontal direction. The last arm portion 18*c* is a non-limiting example of "one of the plurality of arms" according to the invention. Because of the above-explained structure, as illustrated in FIG. 10, when the rotation angle of the cam member 17 changes from 315° to 337.5°, that is, when the carriage 19 (sliding-contact portion 31) travels in the rightward direction in the outward movement thereof, which is the non-printing-area-side direction, the last arm portion 18*c* is brought into contact with the right surface of the carriage 19 at a point in time that is slightly earlier than a point in time at which each of remaining arm portions 18*c* other than the last arm portion 18*c* is brought into contact with the right surface of the carriage 19.

Therefore, when the carriage 19 (sliding-contact portion 31) travels in the rightward direction in the outward movement thereof, which is toward the non-printing area, the motion vector amount of the outward movement of the carriage 19 (sliding-contact portion 31) in the rightward direction for the last arm portion 18*c* is slightly smaller than the motion vector amount of the outward movement of the carriage 19 (sliding-contact portion 31) in the rightward direction for each of remaining arm portions 18*c* other than the last arm portion 18*c*. If such a configuration is adopted, a burden (i.e., motor load) placed on the carriage motor 20 at the time when the last arm portion 18*c* is brought into contact with the right surface of the carriage 19 is heavier than a burden placed on the carriage motor 20 at the time when each of remaining arm portions 18*c* other than the last arm portion 18*c* is brought into contact with the right surface of the carriage 19.

Or, in other words, if such a configuration is adopted, the value of a driving current that is required for driving the carriage motor 20 at the time when the last arm portion 18*c* is brought into contact with the right surface of the carriage 19 is larger than the value of a driving current that is required for driving the carriage motor 20 at the time when each of remaining arm portions 18*c* other than the last arm portion 18*c* is brought into contact with the right surface of the carriage 19. Accordingly, it is possible for the control unit 22 to make a judgment as to whether a certain arm portion 18*c* that is in engagement with the sliding-contact portion 31 is the last arm portion 18*c* or one of remaining arm portions 18*c* other than the last arm portion 18*c* on the basis of the driving current value of the carriage motor 20 if a predetermined threshold value N is set in the driving current value of the carriage motor 20.

That is, the control unit 22 can judge that the above-mentioned arm portion 18*c* that is in engagement with the sliding-contact portion 31 is the last arm portion 18*c* if the driving current value of the carriage motor 20 is not smaller than the predetermined threshold value N. On the other hand, the control unit 22 can judge that the above-mentioned arm portion 18*c* that is in engagement with the sliding-contact portion 31 is one of remaining arm portions 18*c* other than the last arm portion 18*c* if the driving current value of the carriage motor 20 is smaller than the predetermined threshold value N.

Therefore, when the rotation angle of the cam member 17 is 337.5°, the control unit 22 can recognize that the position of the cam member 17 will return to the cam HP after the completion of the next homeward movement of the carriage 19 (sliding-contact portion 31) in the leftward direction, which is the printing-area-side direction (i.e., toward the printing area). Thus, it can be said that the engagement of the sliding-contact portion 31 and the last arm portion 18*c* corresponds to the cam HP. It should be noted that the above-described predetermined threshold value N is pre-stored in the control unit 22.

Figure 13:
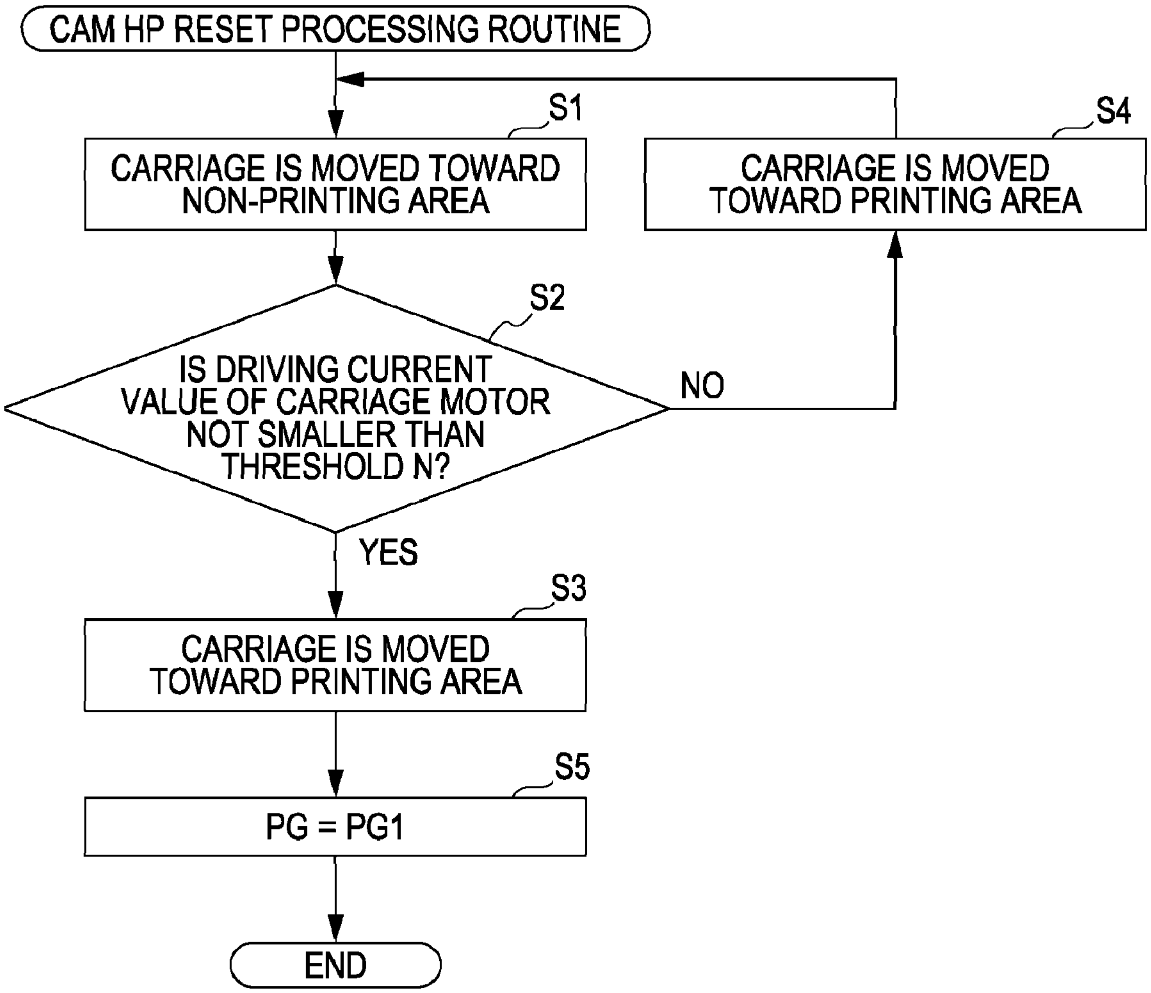
FIG. 13 is a flowchart that schematically illustrates a cam HP reset processing routine, which is adopted in the configuration of an ink-jet printer according to the first embodiment of the invention.

In the following description, among a plurality of control processing routines that are executed by the control unit 22 according to the present embodiment of the invention, a cam HP reset processing routine is explained while making reference to FIG. 13. The cam HP reset processing routine is executed so as to return the cam member 17 to the cam HP at the time when the power of the ink-jet printer 11 according to the present embodiment of the invention is turned ON.

As a first step of the cam HP reset processing routine, the control unit 22 drives the carriage motor 20 so as to move the carriage 19, which lies at the home position HP, in the rightward direction, which is the direction toward the non-printing area. As a result of the above-explained outward traveling of the carriage 19 in the non-printing-area-side direction, the sliding-contact portion 31 thereof is brought into engagement with the arm portion 18*c* of the rotatable member 18 (step S1). As the next step thereof, the control unit 22 makes a judgment as to whether the driving current value of the carriage motor 20 taken in the step S1 is not smaller than the predetermined threshold value N or not (step S2).

If the result of the judgment made in the step S2 is YES, or, in other words, the driving current value of the carriage motor 20 taken in the step S1 is larger than, or at the smallest, equal to, the predetermined threshold value N (step S2: YES), the process goes to the next step S3, which will be explained below. On the other hand, if the result of the judgment made in the step S2 is NO, or, in other words, the driving current value of the carriage motor 20 taken in the step S1 is smaller than the predetermined threshold value N (step S2: NO), the control unit 22 drives the carriage motor 20 so as to move the carriage 19 in the leftward direction, which is the direction toward the printing area. After the above-explained homeward traveling of the carriage 19 in the printing-area-side direction (step S4), the process returns to the step S1.

In the step S3, the control unit 22 drives the carriage motor 20 so as to move the carriage 19 in the leftward direction, which is the direction toward the printing area (i.e., homeward movement). Subsequently, the control unit 22 stores the platen gap PG as PG1 (step S5). That is, the control unit 22 memorizes that the cam member 17 lies at the cam HP. Thereafter, the control unit 22 ends the cam HP reset processing routine.

Figure 14:
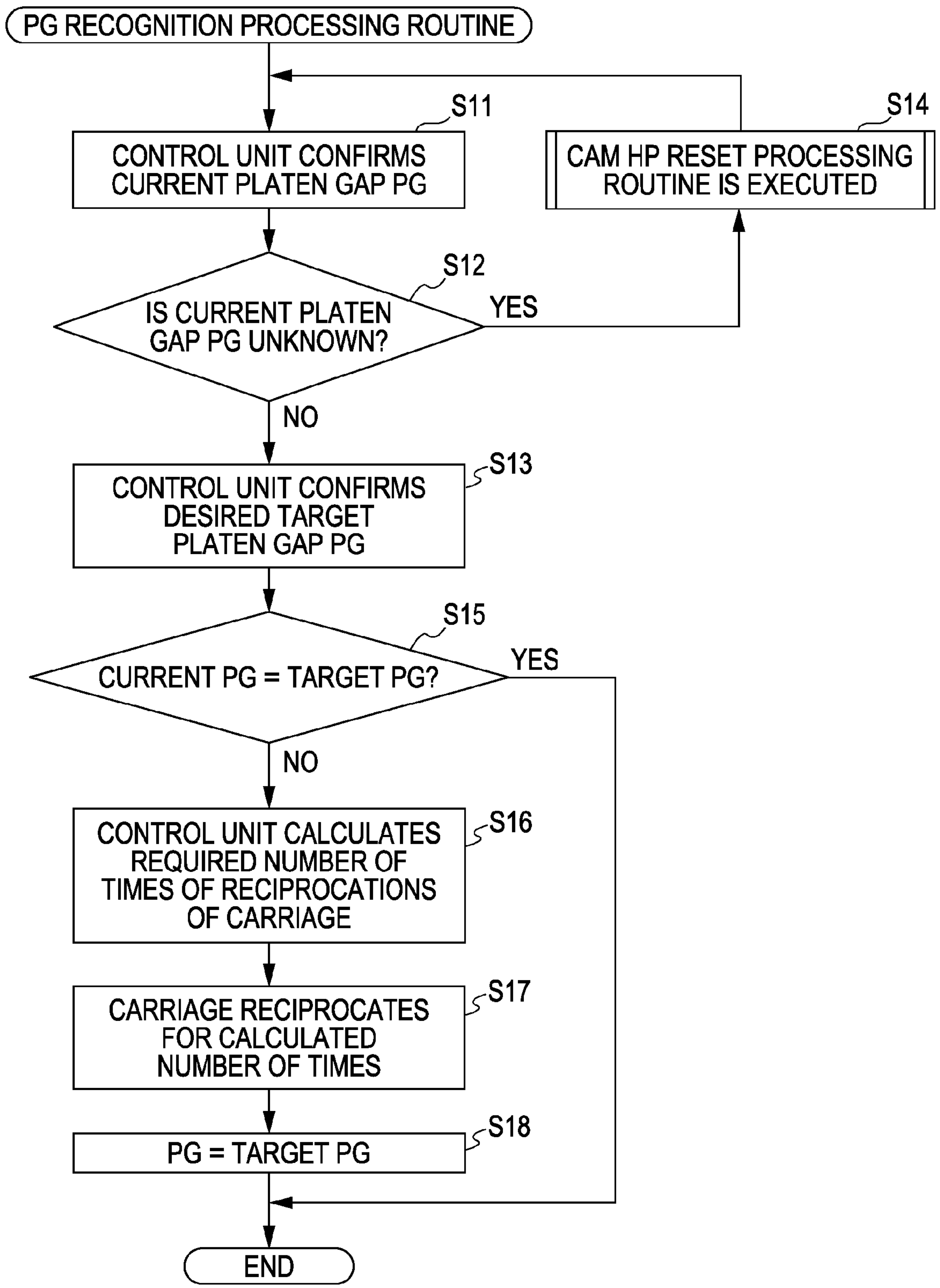
FIG. 14 is a flowchart that schematically illustrates a PG recognition processing routine, which is adopted in the configuration of an ink-jet printer according to the first embodiment of the invention.

In the following description, among a plurality of control processing routines that are executed by the control unit 22 according to the present embodiment of the invention, a PG recognition processing routine is explained while making reference to FIG. 14. The PG recognition processing routine is executed so as to recognize the platen gap PG.

As a first step of the PG recognition processing routine, the control unit 22 confirms the current platen gap PG (step S11). Then, the control unit 22 makes a judgment as to whether the current platen gap PG is unknown or not (step S12). If the result of the judgment made in the step S12 is NO, or, in other words, the current platen gap PG is known, the process goes to the next step S13, which will be explained below. On the other hand, if the result of the judgment made in the step S12 is YES, or, in other words, the current platen gap PG is unknown, the control unit 22 executes the above-explained cam HP reset processing routine (step S14). Thereafter, the process returns to the step S11.

In the step S13, the control unit 22 confirms a target platen gap PG, which is a desired platen gap. Specifically, in this step, the control unit 22 confirms a desired target platen gap PG either on the basis of a printing signal that is inputted from an external device that is connected to the ink-jet printer 11 according to the present embodiment of the invention or on the basis of a control signal that is inputted from a selector switch that is provided on the ink-jet printer 11 according to the present embodiment of the invention. A few examples of the above-mentioned external device that is connected to the ink-jet printer 11 includes but not limited to a personal computer or a digital camera. Thereafter, the control unit 22 makes a judgment as to whether the current platen gap PG is the desired target platen gap PG or not (step S15). If the result of the judgment made in the step S15 is YES, the control unit 22 ends the PG recognition processing routine.

On the other hand, if the result of the judgment made in the step S15 is NO, the control unit 22 calculates the number of times of reciprocatory movements of the carriage 19 that is required for changing the current platen gap PG into the desired target platen gap PG on the basis of the table shown in FIG. 12 (step S16). Thereafter, the control unit 22 drives the carriage motor 20 so as to move the carriage 19 in a reciprocatory manner for the number of times (of reciprocations) calculated in the step S16, thereby rotating the rotatable member 18 (step S17).

Subsequently, the control unit 22 stores the current platen gap PG as the target platen gap PG (step S18). Thereafter, the control unit 22 ends the PG recognition processing routine.

As explained in detail above, the ink-jet printer 11 according to the foregoing first embodiment of the invention offers the following advantageous effects of the invention, though not necessarily limited thereto.

(1) As a result of the reciprocatory movements of the carriage 19 in the main scan direction, or, in other words, in the horizontal direction, it is possible to move the guide axis 14, which provides a support to the carriage 19. Or, more specifically, as the carriage 19 reciprocates in the horizontal main-scan direction, the level of the guide axis 14 changes in such a manner that the recording head 23 that is provided on the bottom of the carriage 19 moves toward (i.e., closer to) or away from recording paper P in the vertical direction. With such a configuration of the ink-jet printer 11 according to the foregoing first embodiment of the invention, it is possible to adjust the gap (i.e., distance) between the recording head 23 that is provided on the bottom of the carriage 19 and recording paper P, which is achieved by adjusting the platen gap PG while utilizing the driving force of the carriage 19.

(2) The cam section is embodied as the cam member 17 that rotates together with the guide axis 14 around the rotation axis line thereof that is in alignment with, or, in other words, the same as, the axis line L of the guide axis 14 in the configuration of the ink-jet printer 11 according to the foregoing first embodiment of the invention. Therefore, it is possible to simplify the structure of the cam section.

(3) In the configuration of the ink-jet printer 11 according to the foregoing first embodiment of the invention, the rotatable member 18 is provided only on the right end portion of the guide axis 14. In addition, the rotatable member 18 is configured so that it rotates together with the guide axis 14 around the rotation axis line thereof that is in alignment with, or, in other words, the same as, the axis line L of the guide axis 14. With such a configuration, it is possible to rotate the rotatable member 18 in an efficient manner.

(4) In the configuration of the ink-jet printer 11 according to the foregoing first embodiment of the invention, the rotatable member 18 has eight arm portions 18*c*, which radiate out from the axis line L of the guide axis 14, which is in alignment with, or, in other words, the same as, the rotation axis line of the rotatable member 18 that constitutes the center of the radiation array pattern. In addition, the carriage 19 is provided with the sliding-contact portion 31. During the reciprocation of the carriage 19, the sliding-contact portion 31 of the carriage 19 is brought into contact/engagement with the arm portion 18*c* in a sliding manner so as to turn the rotatable member 18. With such a configuration, it is possible to transmit the driving force of the carriage 19 to the rotatable member 18 in an efficient and reliable manner.

(5) In the configuration of the ink-jet printer 11 according to the foregoing first embodiment of the invention, the sliding-contact portion 31 has the first sloped surface 32*a* that is brought into "sliding-contact" with the arm portion 18*c* as the carriage 19 travels in the rightward direction in the outward movement thereof and further has the second sloped surface 33*a* that is brought into sliding-contact with the arm portion 18*c* as the carriage 19 travels in the leftward direction in the homeward movement thereof. With such a configuration, it is possible to make the horizontal width of the reciprocatory movements of the carriage 19 that is required for rotating the rotatable member 18 smaller. Or, in other words, it is possible to reduce the amplitude of the reciprocations of the carriage 19 in the horizontal direction, which are performed for rotating the rotatable member 18. Therefore, the above-described configuration contributes to a reduction in the size of the ink-jet printer 11.

(6) In the configuration of the ink-jet printer 11 according to the foregoing first embodiment of the invention, a surface of the arm portion 18*c* that is brought into contact with the first sloped surface 32*a* of the sliding-contact portion 31 in a sliding manner has a tapered structure that corresponds to the first sloped surface 32*a* thereof. With such a configuration, it is possible to slide the arm portion 18*c* on the first sloped surface 32*a* thereof in a smooth manner when the carriage 19 is moved in the outward direction so as to rotate the rotatable member 18.

(7) In the configuration of the ink-jet printer 11 according to the foregoing first embodiment of the invention, the cam HP corresponds to the engagement of the last arm portion 18*c* and the sliding-contact portion 31. Therefore, it is possible for the control unit 22 to recognize the cam HP in a reliable manner. Specifically, the control unit 22 detects a burden, that is, motor load, placed on the carriage motor 20 at the time when the last arm portion 18*c* is brought into engagement with the sliding-contact portion 31, thereby reliably detecting the cam HP on the basis thereof.

Second Embodiment

In the following description, a second exemplary embodiment of the invention is explained with a focus on differences between the second embodiment of the invention and the foregoing first embodiment of the invention. It should be noted that the same reference numerals are assigned to the same components as those of the ink-jet printer 11 according to the foregoing first embodiment of the invention; and a detailed explanation thereof is omitted, or an explanation is simplified as long as the understanding of the unique feature of the invention is not impaired.

Figure 15:
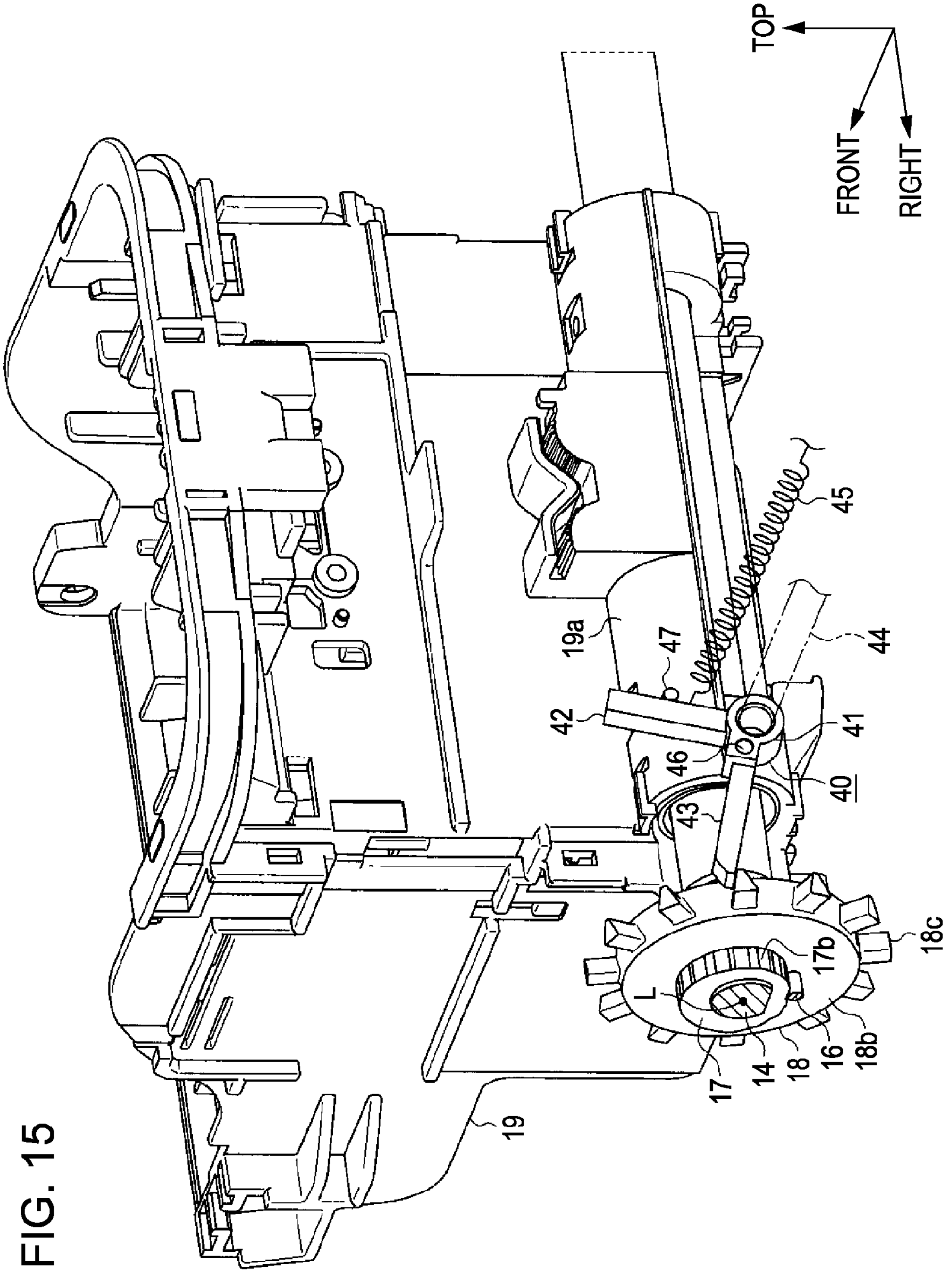
FIG. 15 is a rear right perspective view of the carriage that is provided as a component of an ink-jet printer according to a second embodiment of the invention.
Figure 16:
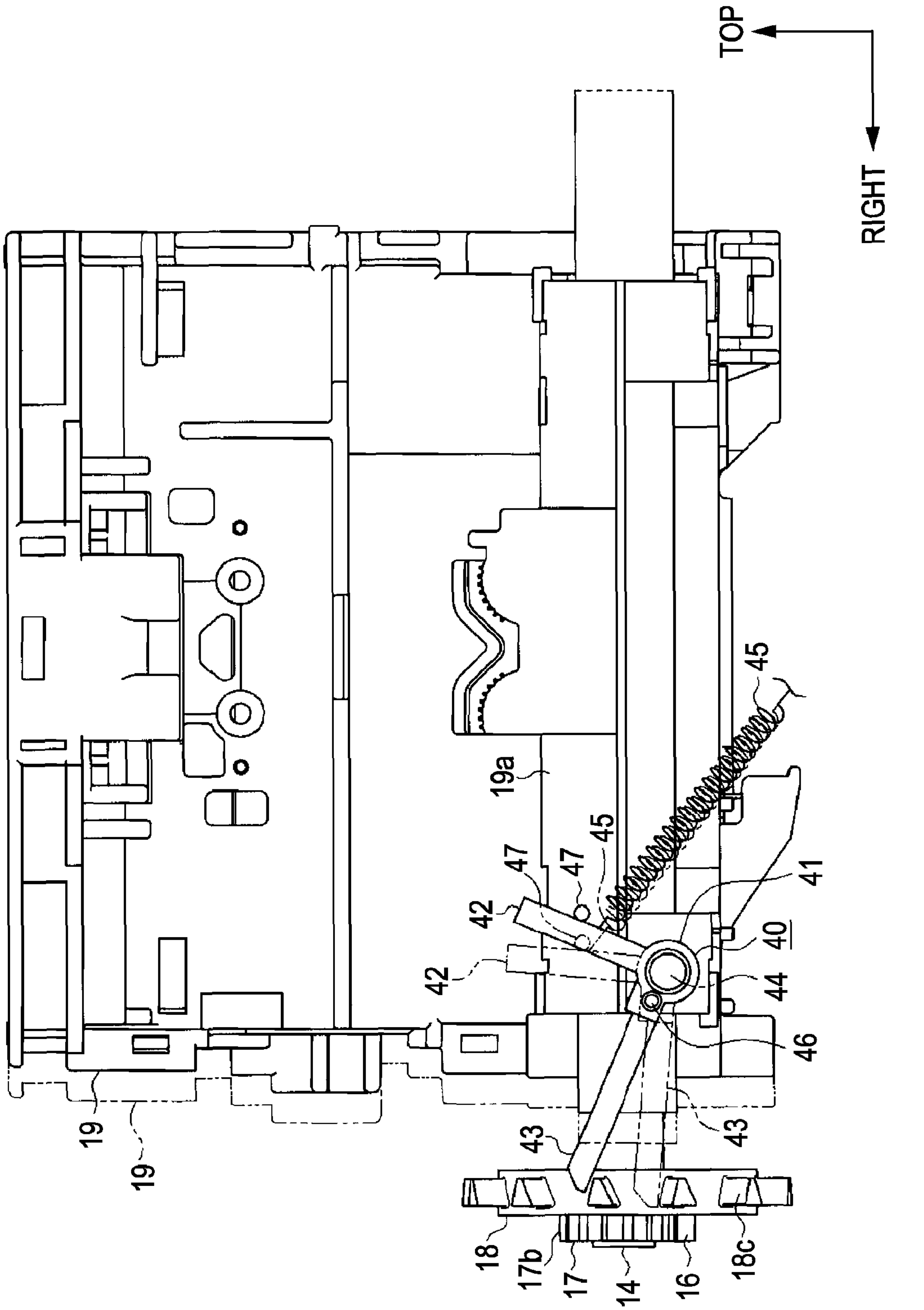
FIG. 16 is a rear view that schematically illustrates an exemplary configuration of the carriage illustrated in FIG. 15.

As illustrated in FIGS. 15 and 16, in the configuration of an ink-jet printer according to the present embodiment of the invention, a lever member 40 is used as a sliding-contact portion in place of the aforementioned block-shaped sliding-contact portion 31 according to the foregoing first embodiment of the invention. When viewed from the rear, the lever member has the shape of an alphabet L. Specifically, the lever member 40 has a fulcrum portion 41, a force application portion 42, and a contact-pushing portion 43. The fulcrum portion 41 of the lever member 40 has a cylindrical shape. The cylindrical fulcrum portion 41 thereof extends in the anteroposterior direction defined earlier. The force application portion 42 of the lever member 40 has the shape of a substantially quadrangular prism. The force application portion 42 thereof extends from the upper surface of the fulcrum portion 41 thereof in the upper left direction. The contact-pushing portion 43 of the lever member 40 also has the shape of a substantially quadrangular prism. The contact-pushing portion 43 thereof extends from the right surface of the fulcrum portion 41 thereof in the upper right direction. In the configuration of an ink-jet printer according to the present embodiment of the invention, the force application portion 42 of the lever member 40 and the contact-pushing portion 43 thereof form an angle of 90°.

The lever member 40 is provided in the proximity of the right end portion of the guide axis 14, specifically, to the left of the rotatable member 18 behind the guide axis 14. A supporting shaft 44 supports the fulcrum portion 41 of the lever member 40. The supporting shaft 44 protrudes from the inner rear surface of the printer body case 12 (refer to FIG. 1). That is, the tip portion of the supporting shaft 44 is inserted in the fulcrum portion 41 of the lever member 40. With such a structure, the lever member 40 can rotate around the supporting shaft 44. One end of a helical spring (i.e., coiled spring) 45 is attached to the left surface of the force application portion 42 of the lever member 40. The other end of the helical spring 45 is attached to the inner rear surface of the printer body case 12 (refer to FIG. 1), that is, the rear surface thereof inside the printer body case 12, at a position where a virtual line that goes from the force application portion 42 thereof in the diagonally leftward and backward direction passes through.

In the configuration of the lever member 40 according to the present embodiment of the invention, a pivot shaft 46, which extends in the anteroposterior direction, supports the contact-pushing portion 43 thereof on the fulcrum portion 41 thereof at the base of the contact-pushing portion 43 thereof. With such a structure, the contact-pushing portion 43 of the lever member 40 cannot rotate in the clockwise direction when viewed from the rear around the pivot shaft 46, whereas the contact-pushing portion 43 thereof can tilt in a rotational manner in the counterclockwise direction when viewed from the rear around the pivot shaft 46.

The lever member 40 according to the present embodiment of the invention is further provided with a contact-pushing-portion position-returning mechanism that is not illustrated in the drawing. This position-returning mechanism returns the tilted position of the contact-pushing portion 43 of the lever member 40 to the pre-tilt position after the contact-pushing portion 43 thereof has tilted in a rotational manner in the counterclockwise direction when viewed from the rear around the pivot shaft 46. It should be noted that the pre-tilt position is a positional state in which the force application portion 42 of the lever member 40 and the contact-pushing portion 43 thereof form an angle of 90°. The tip region of the contact-pushing portion 43 of the lever member 40 can be brought into engagement with the arm portion 18*c* of the rotatable member 18 while establishing and/or maintaining a sliding-contact state therebetween.

An engagement projection 47, which protrudes rearward, is formed on the right end portion of the supporting sleeve 19*a* of the carriage 19. When the carriage 19 is moved to the non-printing area, the engagement projection 47 is brought into contact with the left surface of the force application portion 42 of the lever member 40 at a position above the attachment position of the above-mentioned one end of the helical spring 45.

It should be noted that the outer diameter of the rotatable member 18 according to the second embodiment of the invention described herein is slightly larger than the outer diameter of the rotatable member 18 according to the foregoing first embodiment of the invention. In addition, it should be further noted that the number of the arm portions 18*c* of the rotatable member 18 according to the second embodiment of the invention described herein is not eight but twelve. Moreover, it should be further noted that each of the arm portions 18*c* of the rotatable member 18 according to the second embodiment of the invention described herein is formed as a substantially triangular prism.

As illustrated in FIG. 16, as the carriage 19 is moved in the rightward direction in the non-printing area, the engagement projection 47 applies a pushing force to the force application portion 42 of the lever member 40 in the rightward direction. Accordingly, the lever member 40 rotates in the counterclockwise direction when viewed from the rear around the supporting shaft 44 against the urging force applied by the helical spring 45. Alternate long and two short dashes lines of FIG. 16 show the above-described rotated state of the lever member 40. As the lever member 40 rotates in the counterclockwise direction around the supporting shaft 44 against the urging force applied by the helical spring 45, the tip region of the contact-pushing portion 43 of the lever member 40 is brought into engagement with the arm portion 18*c* of the rotatable member 18. As a result thereof, the contact-pushing portion 43 of the lever member 40 pushes down the arm portion 18*c* of the rotatable member 18.

As the contact-pushing portion 43 of the lever member 40 pushes down the arm portion 18*c* of the rotatable member 18, the rotatable member 18 rotates in the clockwise direction around the axis line L of the guide axis 14 when viewed from the right side thereof by a predetermined rotation angle. In the configuration of an ink-jet printer according to the present embodiment of the invention, it is assumed that the rotatable member 18 rotates by a rotation angle of 30°. As the rotatable member 18 rotates, the cam members 17 also rotate so as to change the level of the guide axis 14 as has already been explained above in the foregoing first embodiment of the invention. As a result thereof, the platen gap PG also changes by a predetermined distance.

On the other hand, as the carriage 19 is moved in the leftward direction in the non-printing area, the lever member 40 rotates in the clockwise direction when viewed from the rear around the supporting shaft 44 due to the urging force applied by the helical spring 45. By this means, the lever member 40 returns to the original state/position thereof, which is illustrated by solid lines in FIG. 16. When the lever member 40 returns to the original state/position thereof, the contact-pushing portion 43 of the lever member 40 is brought into contact with the lower surface of the "upper-adjacent" arm portion 18*c* that is next to the depressed arm portion 18*c*. However, the contact-pushing portion 43 thereof that is brought into contact with the lower surface of the upper-adjacent arm portion 18*c* never pushes up this upper-adjacent arm portion 18*c* because the contact-pushing portion 43 thereof can tilt in a rotational manner in the counterclockwise direction when viewed from the rear around the pivot shaft 46. For this reason, although the contact-pushing portion 43 of the lever member 40 is brought into contact with the lower surface of the upper-adjacent arm portion 18*c* that is next to the pushed-down arm portion 18*c* in the course of the returning of the lever member 40 to its original state/position, such a contact has no effect on the movement of the rotatable member 18. Then, after the contact-pushing portion 43 of the lever member 40 has been released from the arm portion 18*c*, the aforementioned contact-pushing-portion position-returning mechanism that is not illustrated in the drawing returns the tilted position of the contact-pushing portion 43 thereof to its pre-tilt original position.

In this way, the reciprocations of the carriage 19 in the horizontal direction in the non-printing area are repeated until the platen gap PG reaches a desired value. By this means, the platen gap PG is adjusted as done in the foregoing first embodiment of the invention.

As explained in detail above, an ink-jet printer according to the foregoing second embodiment of the invention offers the following advantageous effect of the invention, though not necessarily limited thereto.

(8) With the configuration of an ink-jet printer according to the second embodiment of the invention described above, it is possible to rotate the rotatable member 18 by a predetermined rotation angle by moving the carriage 19 in the rightward direction (i.e., outward movement) only in the non-printing area, which means that it is not necessary to reciprocate the carriage 19 in the horizontal direction in the non-printing area in order to rotate the rotatable member 18 by a predetermined rotation angle.

Variation Examples

The foregoing exemplary embodiment of the invention may be modified as follows.

As a non-limiting modified configuration of the sliding-contact portion 31 according to the foregoing first embodiment of the invention, the second sloped portion 33 may be omitted. If the second sloped portion 33 is omitted from the configuration of the sliding-contact portion 31 according to the foregoing first embodiment of the invention, the length of the first sloped surface 32*a* of the first sloped portion 32 should be great enough, which is substantially greater (i.e., longer) than that of the foregoing exemplary embodiment of the invention, so that the rotatable member 18 (cam members 17) can rotate by a rotation angle of 45° with the outward movement of the carriage 19 in the rightward direction only.

As a non-limiting modified configuration of the ink-jet printer 11 (which is a non-limiting example of an image formation apparatus as has already been explained earlier, the same applies hereunder) according to the foregoing first embodiment of the invention, an additional rotatable member 18 may be provided on the left end portion of the guide axis 14 in such a manner that the additional rotatable member 18 contacts the right-side surface of the left one of the pair of the cam members 17. If such a modified configuration is adopted, it is necessary that the sliding-contact portion 31 having an inverted upside-down structure should be provided on the left surface of the carriage 19. With the modified configuration described above, it is possible to rotate the additional left-side rotatable member 18 that is provided on the left end portion of the guide axis 14 in a reverse rotation direction, which is opposite to the rotation direction of the other right-side rotatable member 18 that is provided on the right end portion of the guide axis 14. That is, with the modified configuration described above, it is possible to rotate the cam members 17 not only in a normal rotation direction but also in a reverse rotation direction. Therefore, it is possible to switch over the platen gap PG from one of the PG positions 1, 2, 3, and 4 to another thereof. Specifically, for example, in a case where the platen gap PG is switched from the PG position 2 over to the PG position 1, it is possible to complete such a switchover in a speedier manner.

In the configuration of the rotatable member 18 according to the foregoing first embodiment of the invention, it is not always necessary that each arm portion 18*c* thereof should have the sliding-contact surface 18*d*. That is, as a non-limiting modified configuration thereof, the sliding-contact surface 18*d* of each arm portion 18*c* of the rotatable member 18 may be omitted.

In the configuration of the ink-jet printer 11 according to the foregoing first embodiment of the invention, it is explained that the selection, that is, switchover, of the platen gap PG can be made among four positional scales, which are made up of the PG positions 1, 2, 3, and 4. However, the scope of the invention is not limited to such an exemplary configuration. For example, the selection of the platen gap PG may be made among five or more positional scales. Or, the selection of the platen gap PG may be made among two or three positional scales. Although such a modification of the number of positional scales may be made, it should be noted that the maximum scale number of the PG positions is eight in the configuration of the ink-jet printer 11 according to the foregoing first embodiment of the invention. It should be further noted that a combination of these PG positions is not limited to a specific exemplary combination described above as the configuration of the ink-jet printer 11 according to the foregoing first embodiment of the invention. That is, any other two of more of these PG positions may be selected as a modified configuration thereof.

In the configuration of an ink-jet printer according to each of the foregoing first and second embodiments of the invention, it is explained that the rotatable member 18, the guide axis 14, and the cam members 17 rotate together around the axis line L of the guide axis 14. However, the scope of the invention is not limited to such an exemplary configuration. For example, any one or more of these rotatable member 18, guide axis 14, and cam members 17 may rotate around an axis line(s) that differs from the axis line(s) of the other(s). If such a modified configuration is adopted, it is necessary to provide a power transmission mechanism made up of a gear(s), though not necessarily limited thereto, so that the rotation force of the rotatable member 18 is communicated (i.e., transmitted) to the guide axis 14 and/or the cam members 17.

In the configuration of an ink-jet printer according to each of the foregoing first and second embodiments of the invention, it is explained that the cam members 17 and the rotatable member 18 are provided as discreet components that are separated from each other. However, the scope of the invention is not limited to such an exemplary configuration. For example, the cam member 17 and the rotatable member 18 may be formed as a single integrated part that doubles as the cam member 17 and the rotatable member 18. That is, a part of the rotatable member 18 may function as the cam section according to the invention. With such a modified configuration, it is possible to reduce the number of parts.

In the configuration of an ink-jet printer according to each of the foregoing first and second embodiments of the invention, the shape of each arm portion 18*c* of the rotatable member 18 may be modified so that it has the shape of a circular cylinder (i.e., cylindrical column) or a cylindroid (i.e., elliptic cylinder). Or, as another non-limiting modification example thereof, each arm portion 18*c* of the rotatable member 18 may have the shape of a polygonal prism such as a pentagonal prism or a hexagonal prism, though not limited thereto.

In the configuration of an ink-jet printer according to each of the foregoing first and second embodiments of the invention, the number of the arm portions 18*c* of the rotatable member 18 may be modified into any arbitrary number such as four or five as long as it is not smaller than three.

In the configuration of an ink-jet printer (image formation apparatus) according to each of the foregoing first and second embodiments of the invention, it is explained that the ink cartridges 24 are detachably attached to the cartridge attachment portion of the carriage 19. However, the scope of the invention is not limited to such an exemplary configuration. For example, as a non-limiting modification example thereof, a so-called off-carriage-type printer configuration may be adopted. In the configuration of an off-carriage-type printer, ink cartridges are attached to other attachment position that is not on the carriage 19. In such an off-carriage configuration, ink contained in the ink cartridges is supplied to the recording head 23 via an ink-supply tube.

In each of the foregoing first and second embodiments of the invention, an ink-jet printer (11) is taken as an example of an image formation apparatus. However, the scope of the invention is not limited to such an exemplary application. As a non-limiting modification example thereof, an image formation apparatus may be embodied and/or implemented as a dot impact printer or a thermal transfer printer, though not limited thereto.

What is claimed is:

1. A gap adjustment apparatus comprising:

a recording section;

a guide axis that supports the recording section in such a manner that the recording section can move while facing a recording target medium, the guide axis being able to move in such a manner that a gap between the recording section and the recording target medium can be adjusted;

a cam section that is either provided directly on the guide axis or provided not directly on the guide axis so as to engage indirectly with the guide axis, the cam section being able to rotate so as to move the guide axis;

a rotatable member that rotates together with the cam section;

an arm section that is provided either as a part of or on the rotatable member and substantially radiates out from a rotation axis line of the rotatable member; and a rotating section that is brought into engagement with the arm section as the recording section moves in a main scan direction and rotates the rotatable member by transmitting a force to the rotatable member via the arm section, wherein the rotating section has a sliding-contact portion that moves together with the recording section in the main scan direction; and, at the time when the recording section moves in the main scan direction, the arm section slides on the sliding-contact portion in such a manner that the rotatable member rotates.

2. The gap adjustment apparatus according to claim 1, wherein the sliding-contact portion has a first sloped surface that is brought into sliding-contact with the arm section at the time when the recording section moves in an outward direction so as to rotate the rotatable member in a predetermined direction and further has a second sloped surface that is brought into sliding-contact with the arm section at the time when the recording section moves in a homeward direction so as to rotate the rotatable member in the predetermined direction.

3. The gap adjustment apparatus according to claim 1, wherein the arm section has at least three arms.

4. The gap adjustment apparatus according to claim 1, wherein the cam section is made up of cams that rotate together with the guide axis around a rotation axis line that is in alignment with, or, the same as, the axis line of the guide axis.

5. An image formation apparatus comprising:

the gap adjustment apparatus according to claim 1; and a body case in which the gap adjustment apparatus is housed.

6. A gap adjustment apparatus comprising:

a recording section;

a guide axis that supports the recording section in such a manner that the recording section can move while facing a recording target medium, the guide axis being able to move in such a manner that a gap between the recording section and the recording target medium can be adjusted;

a cam section that is either provided directly on the guide axis or provided not directly on the guide axis so as to engage indirectly with the guide axis, the cam section being able to rotate so as to move the guide axis;

a rotatable member that rotates together with the cam section;

an arm section that is provided either as a part of or on the rotatable member and substantially radiates out from a rotation axis line of the rotatable member;

a rotating section that is brought into engagement with the arm section as the recording section moves in a main scan direction and rotates the rotatable member by transmitting a force to the rotatable member via the arm section;

a burden detecting section that detects a burden placed at each time when an arm is brought into engagement with the rotating section; and a judging section that judges, on the basis of a result of detection made by the burden detecting section, an initial position of the cam section that corresponds to the engagement of the above-mentioned one of the plurality of arms and the rotating section, wherein the arm section has a plurality of arms; and a burden that is placed at the time when one of the plurality of arms is brought into engagement with the rotating section differs from a burden that is placed at the time when each of the remaining arms other than the above-mentioned one of the plurality of arms is brought into engagement with the rotating section.

7. A gap adjustment apparatus comprising:

a recording section;

a guide axis that supports the recording section in such a manner that the recording section can move while facing a recording target medium, the guide axis being able to move in such a manner that a gap between the recording section and the recording target medium can be adjusted;

a cam section that is either provided directly on the guide axis or provided not directly on the guide axis so as to engage indirectly with the guide axis, the cam section being able to rotate so as to move the guide axis;

a rotatable member that rotates together with the cam section;

an arm section that is provided either as a part of or on the rotatable member and substantially radiates out from a rotation axis line of the rotatable member; and a rotating section that is brought into engagement with the arm section as the recording section moves in a main scan direction and rotates the rotatable member by transmitting a force to the rotatable member via the arm section, wherein the rotatable member is provided on at least one end portion of two end portions of the guide axis.

* * * * *